US012464225B2

United States Patent
Hanayama

(10) Patent No.: US 12,464,225 B2
(45) Date of Patent: Nov. 4, 2025

(54) CONTROL APPARATUS, IMAGE CAPTURING APPARATUS, CONTROL METHOD, RECORDING MEDIUM, AND IMAGE CAPTURING SYSTEM

(71) Applicant: CANON KABUSHIKI KAISHA, Tokyo (JP)

(72) Inventor: Tatsuya Hanayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 18/333,673

(22) Filed: Jun. 13, 2023

(65) Prior Publication Data

US 2023/0421893 A1 Dec. 28, 2023

(30) Foreign Application Priority Data

Jun. 22, 2022 (JP) ................. 2022-100418

(51) Int. Cl.
*H04N 23/60* (2023.01)
*H04N 23/611* (2023.01)

(52) U.S. Cl.
CPC ........... *H04N 23/64* (2023.01); *H04N 23/611* (2023.01)

(58) Field of Classification Search
CPC .... H04N 23/64; H04N 23/611; H04N 23/661; H04N 23/695
See application file for complete search history.

(56) References Cited

U.S. PATENT DOCUMENTS

2017/0094160 A1* 3/2017 Bostick ............... G06F 16/5866
2022/0116551 A1* 4/2022 Hiraishi ................ G03B 17/53

FOREIGN PATENT DOCUMENTS

JP 2012-124793 A 6/2012

OTHER PUBLICATIONS

JP2021002825-A (Image providing system, image providing device, and control method of the same) (Year: 2021).*

* cited by examiner

Primary Examiner — Yogesh K Aggarwal
(74) Attorney, Agent, or Firm — Cowan, Liebowitz & Latman, P.C.

(57) ABSTRACT

A control apparatus controls an operation of an image capturing apparatus that obtains, through automatic shooting with a variable composition, an image to be sold to a user. The apparatus obtains demand information indicating demand tendencies of a user in relation to compositions of a subject, sets, based on the obtained demand information, frequencies of adoption to shooting respectively for a plurality of types of compositions that have been set in advance, and determines a composition to be used in shooting of the subject by the image capturing apparatus based on the frequencies of adoption that have been set respectively for the plurality of types of compositions. The demand information is based on purchase information related to a purchase of images by the user.

17 Claims, 10 Drawing Sheets

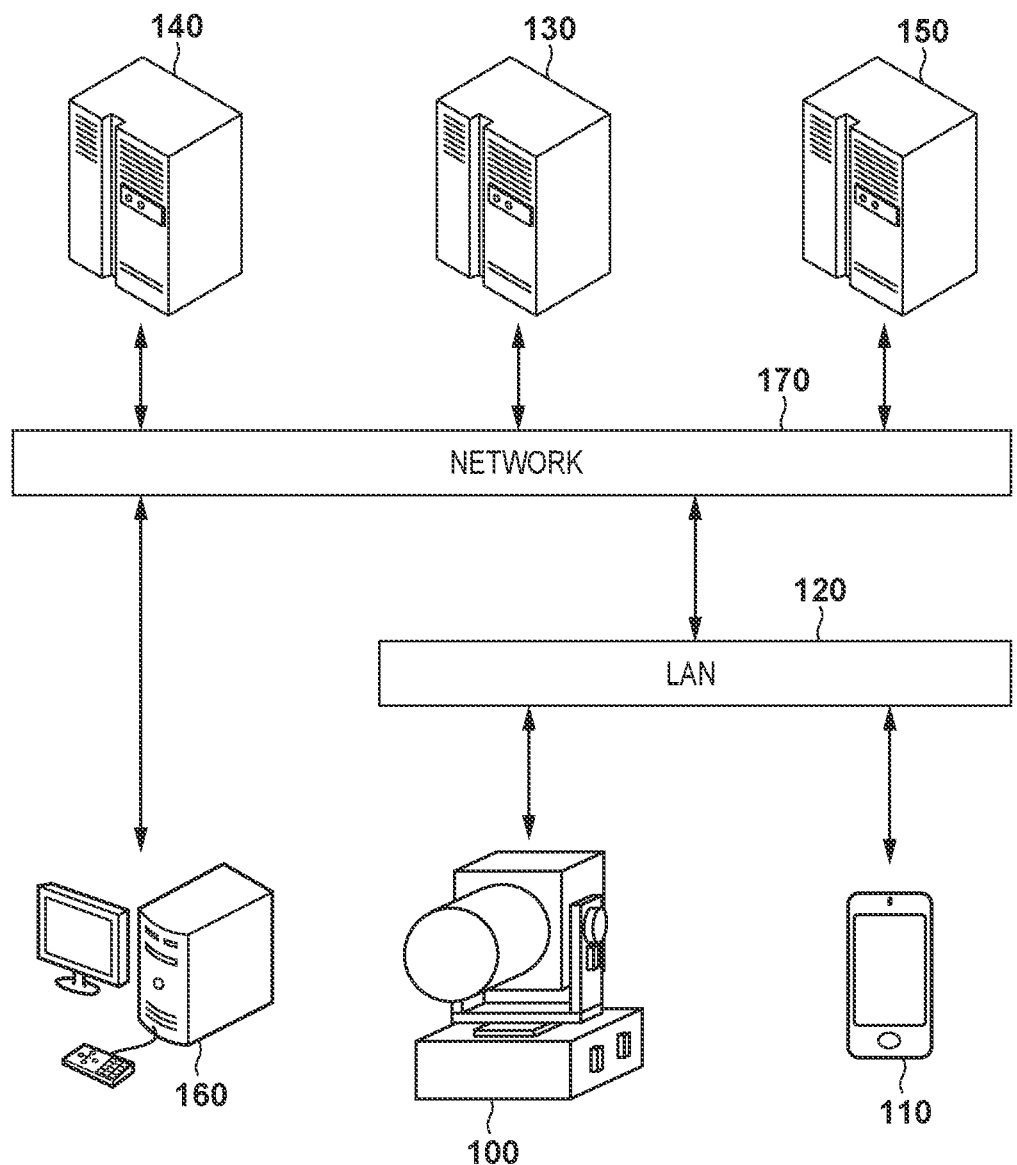

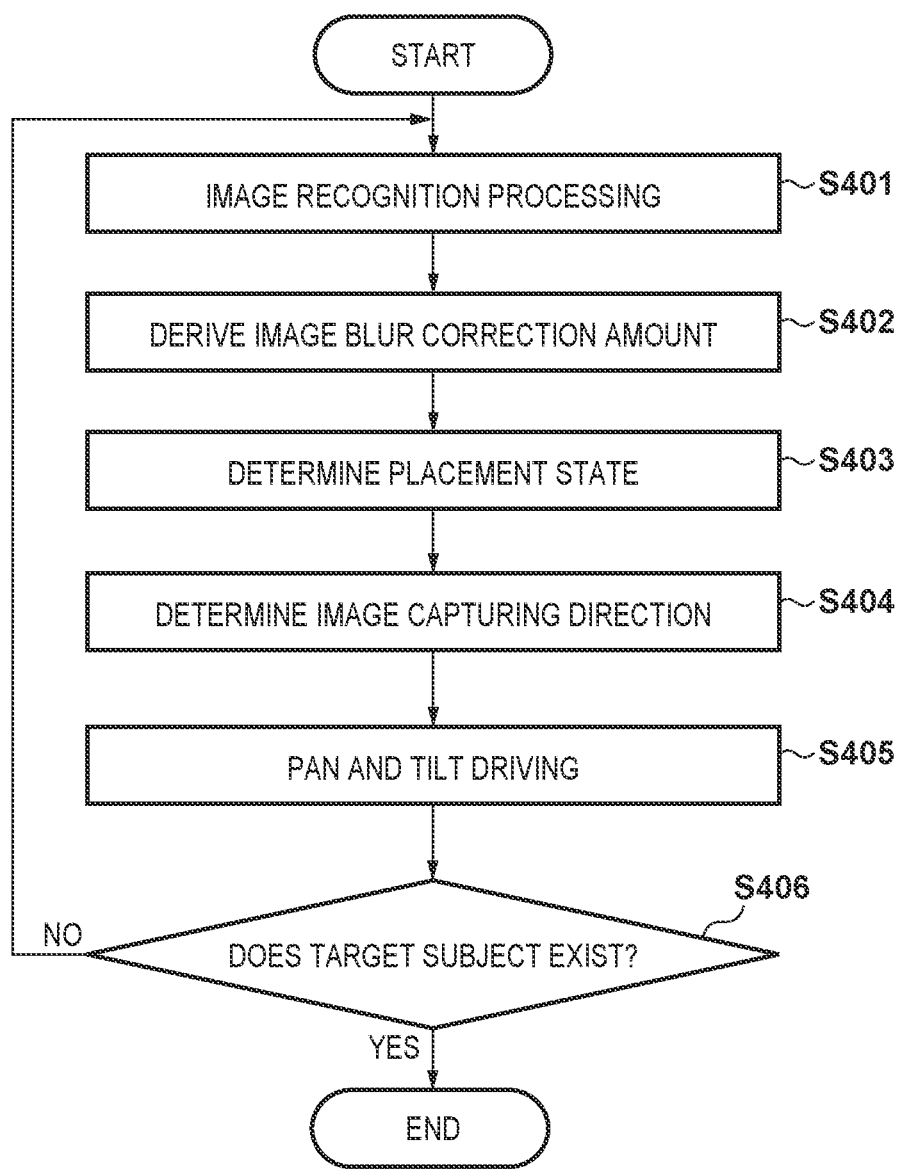

FIG. 6A
| OCCUPANCY RATE | NUMBER PURCHASED |
|---|---|
| 40% OCCUPANCY RATE | 2 |
| 20% OCCUPANCY RATE | 1 |
| 10% OCCUPANCY RATE | 1 |
FIG. 6B
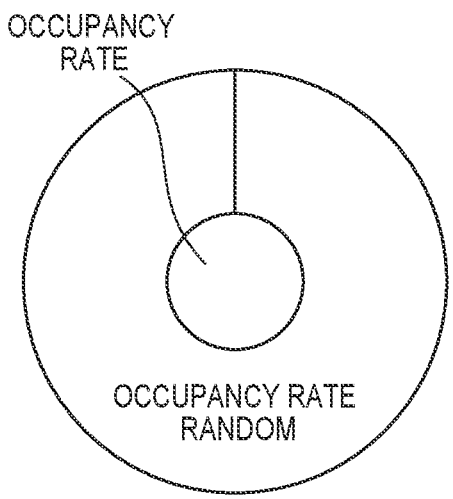
CASE WHERE DEMAND INFORMATION HAS NOT BEEN OBTAINED
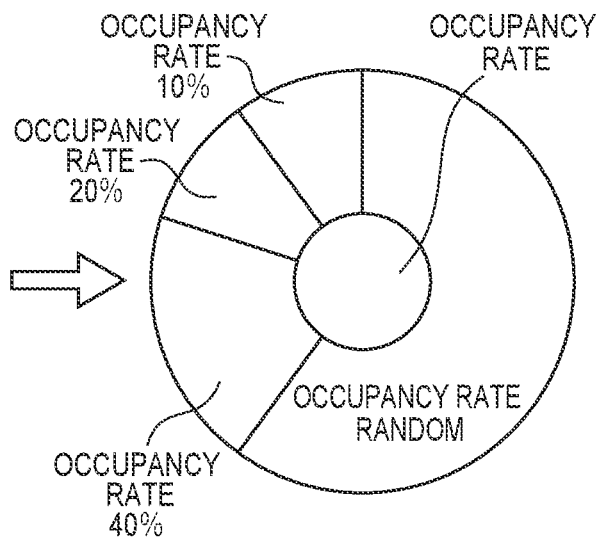
CASE WHERE DEMAND INFORMATION HAS BEEN OBTAINED

FIG. 8A
| A | B | C |
|---|---|---|
| D | E | F |
| G | H | I |
FIG. 8B
| FACE POSITION | NUMBER OF PURCHASES |
|---|---|
| FACE POSITION E | 2 |
| FACE POSITION B | 1 |
| FACE POSITION F | 1 |
FIG. 8C
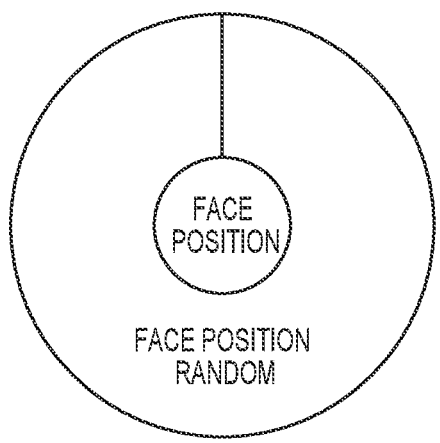
CASE WHERE DEMAND INFORMATION HAS NOT BEEN OBTAINED
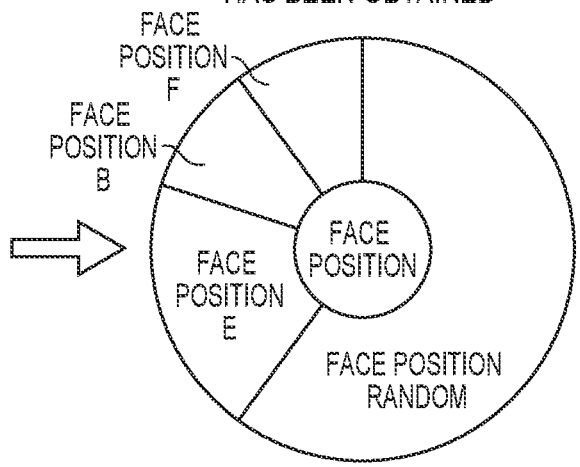
CASE WHERE DEMAND INFORMATION HAS BEEN OBTAINED

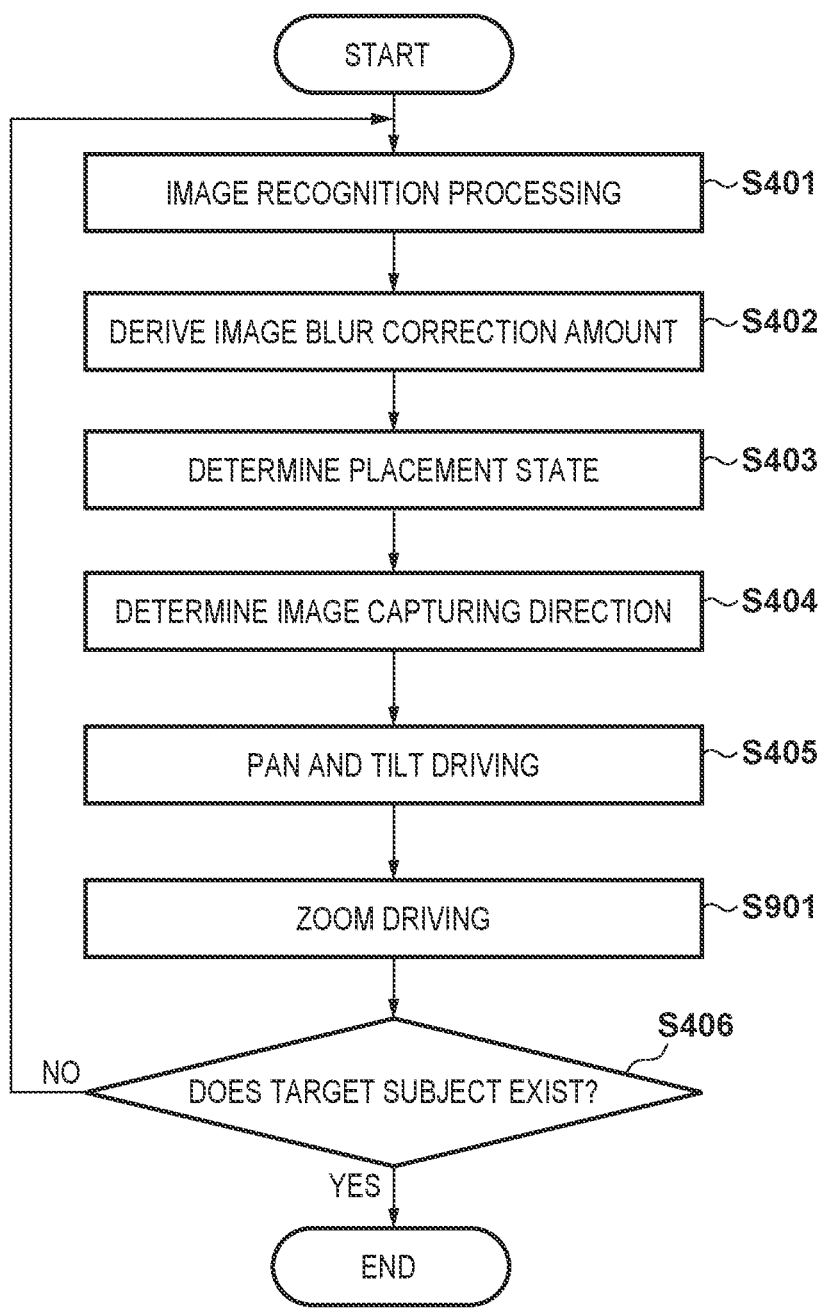

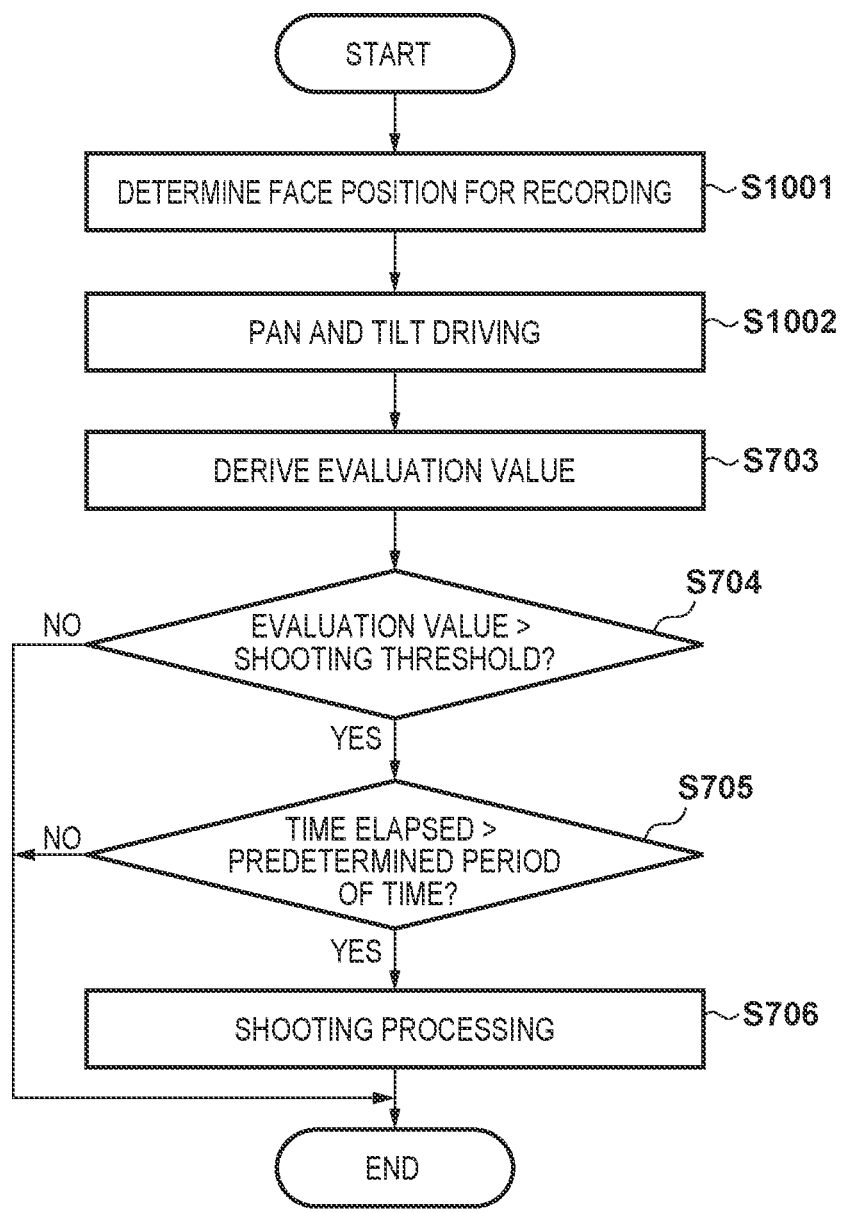

CONTROL APPARATUS, IMAGE CAPTURING APPARATUS, CONTROL METHOD, RECORDING MEDIUM, AND IMAGE CAPTURING SYSTEM

BACKGROUND OF THE INVENTION

Field of the Invention

The present invention relates to a control apparatus, an image capturing apparatus, a control method, a recording medium, and an image capturing system, and in particular to a system that performs automatic shooting by detecting a subject.

Description of the Related Art

A monitoring system and the like incorporates an image capturing apparatus that detects a predetermined subject, performs shooting that is not subject to a shooting instruction input by a user (hereinafter may be referred to as automatic shooting), and records images. In recent years, the development of a service that allows a user to attain images recorded through automatic shooting at festivals and events, such as sports festivals, recitals, and the like, with use of such an image capturing apparatus, has been envisaged.

In automatic shooting, as inputting of a shooting instruction by a user is not required, there is a possibility that images of the user's preference are not recorded. In view of this, an image capturing apparatus of Japanese Patent Laid-Open No. 2012-124793 performs automatic shooting under the condition that a smiling face of a person who acts as a subject has been detected.

However, with regard to an image obtained by the image capturing apparatus of Japanese Patent Laid-Open No. 2012-124793 through automatic shooting, although the user's preference is reflected in terms of the facial expression of the subject, there is a possibility that the user's preference is not reflected in terms of the composition of the entire image.

SUMMARY OF THE INVENTION

The present invention has been made in view of the aforementioned problem, and provides a control apparatus, an image capturing apparatus, a control method, a recording medium, and an image capturing system that realize automatic shooting by which an image that meets the demand of a user is easily recorded.

The present invention in its first aspect provides a control apparatus that controls an operation of an image capturing apparatus that obtains, through automatic shooting with a variable composition, an image to be sold to a user, the control apparatus comprising at least one processor and/or circuit configured to function as the following units: a first obtainment unit configured to obtain demand information indicating demand tendencies of a user in relation to compositions of a subject; a setting unit configured to, based on the demand information obtained by the first obtainment unit, set frequencies of adoption to automatic shooting respectively for a plurality of types of compositions that have been set in advance; and a determination unit configured to determine a composition to be used in shooting of the subject by the image capturing apparatus based on the frequencies of adoption that have been set by the setting unit respectively for the plurality of types of compositions, wherein the demand information is based on purchase information related to a purchase of images by the user.

The present invention in its second aspect provides an image capturing apparatus, comprising: an image capturing unit; the control apparatus according to the first aspect; and a unit configured to cause the image capturing unit to shoot an image for recording based on information of the composition to be used in the shooting determined by the control apparatus.

The present invention in its third aspect provides a control method for a control apparatus that controls an operation of an image capturing apparatus that obtains, through automatic shooting with a variable composition, an image to be sold to a user, the control method comprising: obtaining demand information indicating demand tendencies of a user in relation to compositions of a subject; based on the obtained demand information, setting frequencies of adoption to shooting respectively for a plurality of types of compositions that have been set in advance; and determining a composition to be used in shooting of the subject by the image capturing apparatus based on the frequencies of adoption that have been set respectively for the plurality of types of compositions, wherein the demand information is based on purchase information related to a purchase of images by the user.

The present invention in its fourth aspect provides a computer-readable recording medium having recorded therein a program for causing a computer to function as each unit of the control apparatus according to the first aspect.

The present invention in its fifth aspect provides an image capturing system that sells, to a user, images that have been shot by an image capturing apparatus through automatic shooting while changing a composition, the image capturing system including the image capturing apparatus, a control apparatus that controls an operation of the image capturing apparatus, and a collection server that collects demand tendencies of the user based on images purchased by the user, the control apparatus including at least one processor and/or circuit configured to function as the following units: an obtainment unit configured to obtain demand information indicating demand tendencies of a user in relation to compositions of a subject; a setting unit configured to, based on the demand information obtained by the obtainment unit, set frequencies of adoption to shooting respectively for a plurality of types of compositions that have been set in advance; and a determination unit configured to determine a composition to be used in shooting of the subject by the image capturing apparatus based on the frequencies of adoption that have been set by the setting unit respectively for the plurality of types of compositions, wherein the demand information is based on purchase information related to a purchase of images by the user.

Further features of the present invention will become apparent from the following description of exemplary embodiments (with reference to the attached drawings).

BRIEF DESCRIPTION OF THE DRAWINGS

FIG. 1 is a diagram exemplarily showing a configuration of an image capturing system according to embodiments and modification examples of the present invention.

FIG. 4 is a flowchart exemplarily showing processing related to a search operation in an automatic shooting sequence according to a first embodiment of the present invention.

FIGS. 6A and 6B are diagrams for describing a change in the probability of adoption of each composition based on demand information according to the first embodiment of the present invention.

FIGS. 8A, 8B and 8C are diagrams for describing a change in the probability of adoption of each composition based on demand information according to a second embodiment of the present invention.

FIG. 9 is a flowchart exemplarily showing processing related to a search operation in an automatic shooting sequence according to the second embodiment of the present invention.

FIG. 10 is a flowchart exemplarily showing processing related to shooting determination in the automatic shooting sequence according to the second embodiment of the present invention.

DESCRIPTION OF THE EMBODIMENTS

First Embodiment

Figure 2A:
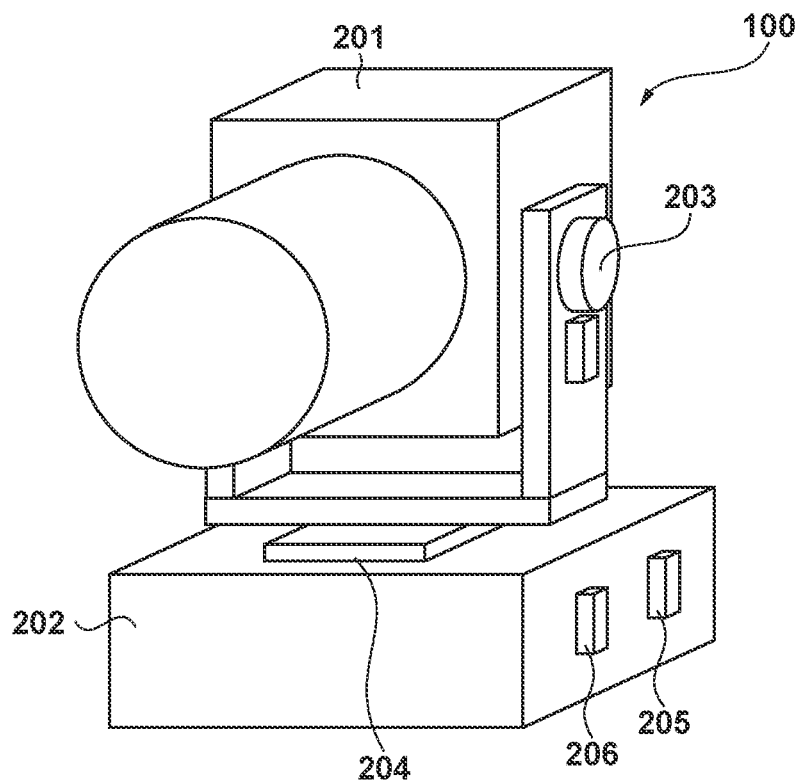
FIGS. 2A and 2B are diagrams for describing an image capturing apparatus 100 according to embodiments and modification examples of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An embodiment described below pertains to an example in which the present invention is applied to an image capturing apparatus capable of shooting images to be provided to a user while changing a composition (automatic shooting), as one example of a control apparatus. However, the present invention is applicable to any device capable of controlling the composition to be taken with an image capturing apparatus capable of performing automatic shooting in accordance with demand tendencies of a user.

Furthermore, in the present specification, it is assumed that "automatic shooting" is not shooting that is performed upon acceptance of an operational input performed by a user in relation to a shooting instruction, but is shooting that is performed upon determining that shooting should be performed in a current status via scene recognition on a specific apparatus. Here, it is assumed that a "scene" refers to an environment captured by the image capturing apparatus, and may refer to, in a narrow sense, a space that can be captured within the angle of view of the image capturing apparatus with a panning or tilting operation. A captured image, an output from an external sensor, and the like can be used in scene recognition, and the automatic shooting is executed in a case where, for example, the result this recognition satisfies a predetermined shooting condition.

<<Configuration of Image Capturing System>>

FIG. 1 is a diagram schematically showing a configuration of an image capturing system according to an embodiment of the present invention.

The image capturing system of the present embodiment provides a service that sells, to a user, images obtained by an image capturing apparatus 100, which is placed in a predetermined scene, performing automatic shooting with respect to a subject in this scene (hereinafter referred to as recorded images). Although the details will be described later, the image capturing apparatus 100 is configured to be capable of autonomously executing shooting related to image recording, irrespective of an operational input performed by a user. Although the recorded images may be still images or moving images, they are described as still images in the present embodiment in order to facilitate the understanding of the invention.

In the system of FIG. 1, the recorded images obtained through automatic shooting performed by the image capturing apparatus 100 are transmitted, via a communication terminal 110 connected to the same local area network (LAN) 120, to a data server 130 in a network 170. The LAN 120 may be a network configured using wired or wireless connections, and realizes mutual information communication between the image capturing apparatus 100 and the communication terminal 110. Furthermore, the LAN 120 is connected to the network 170 via a non-illustrated router. The network 170 is, for example, a wide-area network, such as the Internet, and enables information communication between an apparatus outside the LAN 120 and the communication terminal 110.

The data server 130 is a server that accumulates recorded images. Although only one image capturing apparatus 100 is shown in the example of FIG. 1, the number of image capturing apparatuses 100 that shoot recorded images is not limited to one, and a plurality of image capturing apparatuses may be included. In this case, the data server 130 collects and accumulates recorded images shot by each image capturing apparatus 100.

A provider server 140 provides a service that sells recorded images accumulated in the data server 130 to users (hereinafter referred to as a shooting sales service). To use the shooting sales service, each user causes a client terminal 160, which may be an electronic device such as a PC, a smartphone, and the like, to access a predetermined site (a service providing site) related to the provider server 140 via a browsing application. On the service providing site of the present embodiment, a user logs into the shooting sales service using identification information unique to the user; as a result, the user can view images related to the user among the recorded images accumulated in the data server 130, and select and purchase desired recorded images from among the same. Here, the recorded images related to the user are equivalent to, for example, images that include the user as an individual, a family member or an acquaintance of the user, a person connected to the user, or the like as a subject, and images with an attribute designated by the user, such as an event attended by the user. The recorded images purchased by a user may be provided to the user, for example, in a mode in which high-resolution data is downloaded, in a mode in which the recorded images are printed on predetermined sheets and mailed, and so forth.

A collection server 150 manages pieces of demand information, which are analyses on the demand tendencies of users, based on information of recorded images purchased by each user of the shooting sales service (purchase information). The image capturing system of the present embodiment is described under the assumption that the pieces of demand information are managed on a per-user basis, that is to say, demand information related to one user is configured based on purchase information of this user. Demand information is information that is referenced in determining the composition with which the image capturing apparatus 100 performs automatic shooting, and is obtained by analyzing the tendencies of compositions with which a user wishes to perform shooting (demand tendencies) from the compositions of subjects related to the recorded images purchased by the user. In a case where the user desires the automatic shooting by the image capturing apparatus 100, demand information based on past purchase information of the user is transmitted to the image capturing apparatus 100; as a result, the operations of the image capturing apparatus 100 are controlled so as to increase the frequency at which the automatic shooting is performed with a composition of the user's preference. Consequently, the automatic shooting is performed with respect to recorded images that are likely to be purchased by the user; therefore, from the viewpoint of the user, recorded images that show a subject in a desired state are more easily attained, whereas from the viewpoint of the service provider, a sales increase is expected.

Although the details will be described later, with regard to the recorded images purchased by a user, the collection server 150 of the present embodiment specifies the occupancy rates of face regions of a person associated with the user (e.g., a family member) in these recorded images (an area relative to an entire recorded image), and analyzes the demand tendencies of the user for the respective occupancy rates. It is assumed that the analysis is performed through machine learning, and the collection server 150 obtains the result of learning related to the demand tendencies of the user by deriving the occupancy rates of face regions of a subject in the purchased recorded images and learning the proportion of each occupancy rate in the entire recorded images that have been purchased.

Note that although the present embodiment is described under the assumption that the apparatuses that compose the image capturing system are in the mode of FIG. 1 for simplicity, the present invention is not limited to being embodied in this way. Each of the functions (e.g., recording of images, sales, and learning) of the respective apparatuses, such as servers, is not necessarily limited to being executed by one apparatus; a part of the functions may be executed by a plurality of apparatuses operating in coordination, or a plurality of functions may be executed by one apparatus. Furthermore, a part of the functions executed by such apparatuses as servers may be executed by the image capturing apparatus 100.

<Configuration of Image Capturing Apparatus 100>

Next, the configuration and the functional configuration of the image capturing apparatus 100 of the present embodiment will be described in detail using FIGS. 2A, 2B, and 3.

Figure 2B:
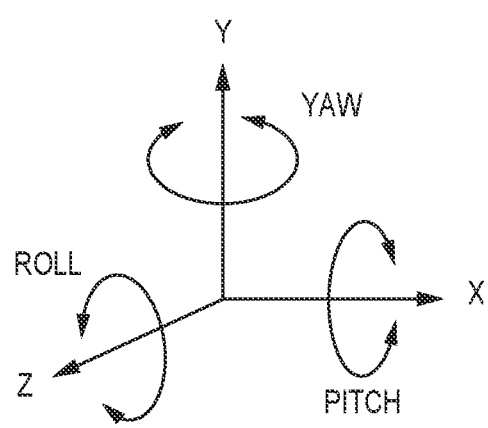

FIG. 2A schematically shows an external configuration of the image capturing apparatus 100. As shown in the figure, a lens barrel 201, which is a housing including a photographing lens assembly and an image sensor that perform image capture, is attached to a fixed unit 202, via a rotation mechanism, on the image capturing apparatus 100. In the example of the figure, a fixed three-dimensional coordinate system (an XYZ Cartesian coordinate system) is set with respect to the fixed unit 202. As shown in FIG. 2B, the rotation mechanism includes a tilt rotation unit 203 that causes the lens barrel 201 to rotate in a pitch direction around the X-axis, and a pan rotation unit 204 that causes the lens barrel 201 to rotate in a yaw direction around the Y-axis. That is to say, in the image capturing apparatus 100 of the present embodiment, the lens barrel 201 is configured to be capable of changing the image capturing direction using the biaxial rotation mechanism that includes the tilt rotation unit 203 and the pan rotation unit 204.

The fixed unit 202 of the image capturing apparatus 100 is provided with an angular velocity meter 205 and an accelerometer 206 that detect vibrations and motions of the image capturing apparatus 100 and the lens barrel 201. When a later-described shake detection unit 309 has detected a vibration based on the outputs from the angular velocity meter 205 and the accelerometer 206, control is performed on driving of at least one of the tilt rotation unit 203 and the pan rotation unit 204 so as to perform blur correction and inclination correction.

Figure 3:
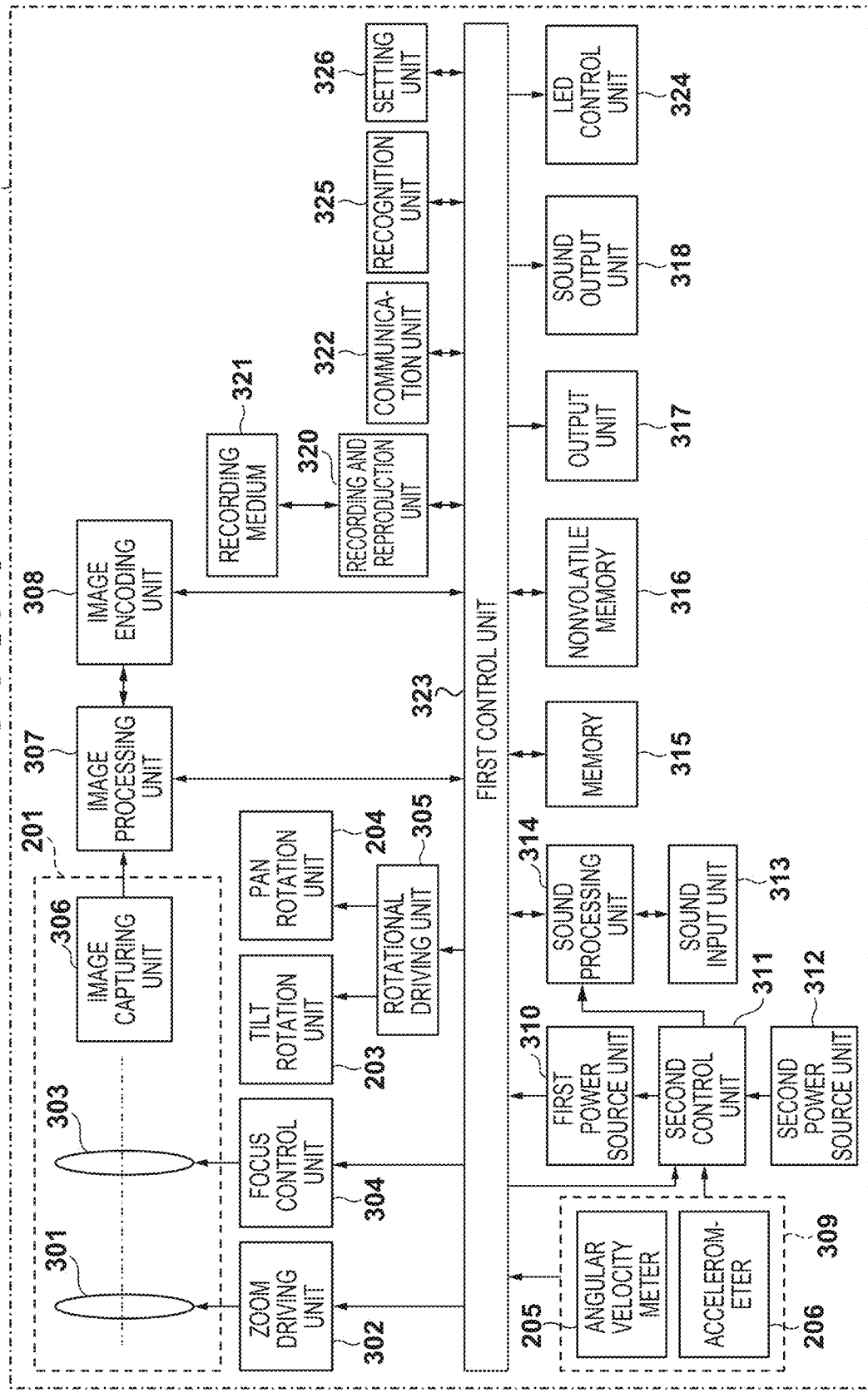
FIG. 3 is a block diagram exemplarily showing a functional configuration of the image capturing apparatus 100 according to embodiments and modification examples of the present invention.

FIG. 3 is a block diagram exemplarily showing the functional configuration of the image capturing apparatus 100.

A first control unit 323 is configured to include a processor (e.g., a CPU, a GPU, a microprocessor, an MPU, or the like) and a memory (e.g., a DRAM, an SRAM, or the like). They control the operations of the blocks of the image capturing apparatus 100, and control data transfer among the blocks, by executing various types of processing. A nonvolatile memory (Flash ROM) 316 is an electrically erasable and recordable memory, and stores, for example, constants and programs for the operations of the first control unit 323.

The lens barrel 201 includes a zoom unit 301 having a zoom lens that performs variable magnification, and a focus unit 303 having a lens that performs focus adjustment. Driving of the zoom unit 301 is controlled by a zoom control unit 302, and driving of the focus unit 303 is controlled by a focus control unit 304.

An image capturing unit 306 includes the image sensor, receives light incident thereon via a lens assembly, and outputs, to an image processing unit 307, digital image data obtained by applying analog-to-digital (A/D) conversion to information of charges corresponding to the amount of the incident light. The image processing unit 307 applies various types of image processing to input image data. When image data has been input from the image capturing unit 306, the image processing unit 307 applies image processing, such as distortion correction, white balance adjustment, and color interpolation processing, to this image data, and outputs the resultant digital image data. The digital image data output from the image processing unit 307 is converted into a recording format, such as a JPEG format, in an image encoding unit 308, and transmitted to a memory 315 and a later-described output unit 317.

A rotational driving unit 305 rotates and drives the lens barrel 201 in the pitch direction and the yaw direction by driving the tilt rotation unit 203 and the pan rotation unit 204. The rotation and driving of the lens barrel 201 caused by the rotational driving unit 305 are used not only to change the image capturing direction, but also to perform blur correction for cancelling out a vibration of the image capturing apparatus 100. The shake detection unit 309 includes the angular velocity meter 205 that detects the angular velocities of the image capturing apparatus 100 in the directions of the three axes, and the accelerometer 206 that detects the accelerations of the apparatus in the directions of the three axes, as described earlier. In this case, a rotation angle, a shift amount, and the like of the image capturing apparatus 100 are derived based on the signals detected by the shake detection unit 309, and used in driving and control of the rotational driving unit 305.

A sound input unit 313 obtains, from a non-illustrated microphone provided in the image capturing apparatus 100, sounds around the image capturing apparatus 100 as a sound signal, applies A/D conversion to the sound signal, and transmits the resultant sound signal to a sound processing unit 314. The sound processing unit 314 executes sound-related processing, such as processing for making the input digital sound data appropriate. Then, the first control unit 323 transmits the sound data processed by the sound processing unit 314 to the memory 315. The memory 315 temporarily stores image data and sound data obtained by the image processing unit 307 and the sound processing unit 314.

In a case where recording is performed at the time of shooting and the like, the image processing unit 307 and the sound processing unit 314 read out the image data and the sound data that have been temporarily stored in the memory 315, execute processing for encoding image signals, encoding the sound data, and so forth, and generate compressed image data and compressed sound data. The first control unit 323 transmits such compressed image data and compressed sound data to a recording and reproduction unit 320.

The recording and reproduction unit 320 records the compressed image data and the compressed sound data that have been generated by the image processing unit 307 and the sound processing unit 314, other control data related to shooting, and the like into a recording medium 321. Furthermore, in a case where compression encoding is not applied to the sound data, the first control unit 323 transmits the sound data generated by the sound processing unit 314 and the compressed image data generated by the image processing unit 307 to the recording and reproduction unit 320, and records them into the recording medium 321.

The recording medium 321 may be a recording apparatus built in the image capturing apparatus 100, or may be a storage apparatus configured to be attachable to and removable from the image capturing apparatus 100. The recording medium 321 can hold various types of data, such as compressed image data and compressed sound data generated by the image capturing apparatus 100, recorded therein, and a storage apparatus having a larger capacity than the nonvolatile memory 316 is typically used thereas. The recording medium 321 may include, for example, recording apparatuses based on a variety of methods, such as a hard disk, an optical disc, a magneto-optical disc, a CD-R, a DVD-R, a magnetic tape, a nonvolatile semiconductor memory, and a flash memory.

The recording and reproduction unit 320 reads out (reproduces) various types of data recorded in the recording medium 321, such as compressed image data and compressed sound data. Then, the first control unit 323 transmits the compressed image data and the compressed sound data that have been read out to the image processing unit 307 and the sound processing unit 314. The image processing unit 307 and the sound processing unit 314 temporarily stores the compressed image data and the compressed sound data into the memory 315, decodes them in a predetermined procedure, and transmits the decoded signals to the output unit 317 and a sound output unit 318.

Note, it is assumed that the sound input unit 313 includes a plurality of non-illustrated microphones, the sound processing unit 314 can detect the directions of sounds in planes in which the plurality of microphones are placed, and such directions are used in a later-described search and automatic shooting. Furthermore, the sound processing unit 314 may be configured to be capable of detecting specific sound commands. The sound commands may be configured to be capable of including commands that have been registered in advance, and in addition, specific sounds that have been registered by users. Furthermore, the sound processing unit 314 may also be capable of recognizing sound scenes. In recognition of sound scenes, a network that has been trained using machine learning based on a massive amount of sound data that has been prepared in advance, determines a scene (a sound scene) in which shooting is performed. For example, a network for detecting specific scenes in which "a cheer has arisen", "an applause has been given", "a voice has been uttered", and the like may be set in the sound processing unit 314 and detectable. In this case, the sound processing unit 314 may be configured to, upon detecting a specific sound scene or a specific sound command, output a detection trigger signal to the first control unit 323 and a second control unit 311.

The second control unit 311 is a control apparatus that is provided separately from the first control unit 323, and controls a supply of power to the first control unit 323. It is assumed that the image capturing apparatus 100 of the present embodiment includes two types of control apparatuses, namely the first control unit 323 and the second control unit 311, so that it can be activated in accordance with not only an operational input performed on an operation member, such as a power switch and the like, but also the aforementioned sound commands and the result of detection performed by the shake detection unit 309. More specifically, in a case where only a limited function, such as sound detection by the sound processing unit 314 and shake detection by the shake detection unit 309, is executed, only the second control unit 311 is brought into operation, controls these units, and determines whether an activation condition of the image capturing apparatus 100 has been satisfied. Then, in a case where the second control unit 311 has determined that the activation condition has been satisfied, it causes a first power unit 310 to supply power to the first control unit 323 so that the operations of all blocks of the image capturing apparatus 100, including shooting, are controlled. The first control unit 323 starts the control in accordance with the determination made by the second control unit 311, and performs various types of operations corresponding to the factor for the activation. Therefore, a second power unit 312 is a power circuit configured to be in an ON state constantly when power has been supplied from a battery connected to the image capturing apparatus 100 or external power has been supplied via an adapter or a USB, and supplies power to the second control unit 311.

An LED control unit 324 controls LEDs provided in the image capturing apparatus 100 so that the LEDs are lit or flash in a preset pattern at the time of, for example, shooting and the like. The sound output unit 318 outputs a preset sound pattern from a speaker built in the image capturing apparatus 100 at the time of, for example, shooting and the like. The output unit 317 is composed of, for example, a video output terminal, and outputs image signals so as to cause a connected external display and the like to display a video. The sound output unit 318 and the output unit 317 may be a single united terminal, for example, a terminal like a High-Definition Multimedia Interface (HDMI®) terminal.

A communication unit 322 is, for example, a communication interface with an external apparatus included in the image capturing apparatus 100, such as an infrared communication module, a Bluetooth® communication module, and a wireless LAN communication module. The communication unit 322 transmits and receives, for example, sound data and image data to and from an external apparatus. In the present embodiment, the image capturing apparatus 100 performs information communication with the communication terminal 110 via the communication unit 322, and transmits recorded images or receives demand information related to the result of learning of the collection server 150. Furthermore, the communication unit 322 may also receive a control signal related to shooting, such as a shooting start or completion command, and panning, tilting or zoom driving, from an external device; in this case, the received control signal is transmitted to the first control unit 323, and driving and control of the image capturing apparatus 100 are performed. Note that although the present embodiment is described under the assumption that the recorded images obtained through shooting performed by the image capturing apparatus 100 are transmitted to the data server 130 via the communication terminal 110, the present invention is not limited to being embodied in this way. The recorded images may be transmitted to the data server 130 directly via communication and connection between the image capturing apparatus 100 and the data server 130.

A recognition unit 325 detects a face of a person who exists in a scene, and executes face recognition processing for recognizing whose face this detected face is, and in particular, whether this detected face belongs to a person to be shot. In the shooting sales service of the present embodiment, the face of a person (subject) to be shot varies depending on a user who uses the same. Therefore, in the image capturing apparatus 100, in a case where a request for automatic shooting has been accepted from a user, a face image of a subject is obtained prior to the automatic shooting. For example, the face image of the subject may be received from a terminal used by the user who made the request for the automatic shooting, may be obtained from the collection server 150, the data server 130, or the like as a face image that has been registered in association with the user, or may be obtained by the image capturing apparatus 100 through preliminary shooting. Therefore, the recognition unit 325 executes face detection processing with respect to captured images that are obtained intermittently during the activation of the image capturing apparatus 100, and in a case a face has been detected, determines whether this face matches the face image of the person to be shot through the face recognition processing. The face recognition processing may use a 2D recognition method that recognizes, for example, the positions of the eyes, nose, mouth, and the like of the face, and performs recognition via cross-referencing with a database, and may further use a 3D recognition method that performs recognition using an infrared sensor and a dot projector.

A setting unit 326 sets a shooting condition under which the automatic shooting is performed. As the image capturing apparatus 100 of the present embodiment performs the automatic shooting without accepting an operational input related to a shooting instruction from a user, a shooting condition indicating under which condition the shooting is performed is set. Although the shooting condition may be set in any manner, it is assumed in a mode described below that the shooting condition is set in relation to an evaluation value obtained by evaluating a degree to which the scene (subject) is appropriate for shooting (a degree of appropriateness for shooting). An evaluation value related to a degree of appropriateness may be obtained by evaluating a captured image in relation to, for example, such evaluation standards as the status of face detection, the result of face recognition, a degree to which the subject is closing their eyes, a facial expression of the face of the subject, the direction of the face, and the size of a subject region. It is assumed that the evaluation value is derived, for example, each time a captured image has been obtained, and it is determined that shooting is to be performed in a case where this evaluation value exceeds a preset shooting threshold. That is to say, the higher the evaluation value is, the more the evaluation value indicates that the scene being captured by the image capturing apparatus 100 is appropriate for shooting. Therefore, the shooting condition may determine a method of deriving this shooting threshold and the shooting threshold.

<<Overview of Shooting Sales Service>>

The following describes an overview of the shooting sales service that is provided using the image capturing system of the present embodiment. The shooting sales service is roughly divided into a shooting stage in which the image capturing apparatus 100 performs automatic shooting upon receiving a request for shooting a predetermined subject (person) from a user, and a sales stage in which the user selects and purchases desired images from among the recorded images that have been recorded through the automatic shooting. The shooting request may be accepted as a result of, for example, the user operating an operational input member provided in the communication terminal 110, or may be accepted when the communication terminal 110 has received corresponding information from a communication terminal used by the user. Alternatively, the shooting request may be accepted via a non-illustrated operational input member provided in the image capturing apparatus 100. Upon accepting the shooting request, the communication terminal 110 transmits information indicating the same to the image capturing apparatus 100 via the LAN 120. At this time, a login to the shooting sales service is required to make the shooting request, and the user is identified based on this login.

The shooting stage is equivalent to, for example, a period in which an event to be shot, such as a sports festival and a school play, is held. The image capturing apparatus 100 is, for example, placed in advance inside a venue or the like by an event organizer or the like; while the event is taking place, it captures images of the venue, and performs shooting and records recorded images in a case where the set shooting condition has been satisfied. The image capturing apparatus 100 may be placed in a mode in which it is fixed (mounted) on, for example, a panhead or a base, or in a mode in which it is movably installed on a car or the like. A subject to be shot is a person associated with the user who made the shooting request; for example, in an event like a sports festival, the subject may be a (user's) child (a pupil) who participates in a competition in this sports festival. Recorded images are uploaded and accumulated in the data server 130 via the communication terminal 110, either in sequence while the event is taking place, or at a predetermined timing after the event has finished.

On the other hand, the sales stage is equivalent to, for example, a period in which, after the upload of the recorded images recorded in the shooting stage to the data server 130 has been completed, a Web page for viewing corresponding to the event (hereinafter referred to as a sales page) is set up on the provider server 140. More specifically, the sales stage is equivalent to a period in which an authority to access this sales page in the service providing site has been granted to the user. The user can access the service providing site from the client terminal 160 via the browsing application (a browser), and view the sales page for which the user has been granted the authority to access by performing a login with inputting of a user ID and a password. On the sales page, the content of each recorded image can be confirmed, whether to purchase each recorded image can be selected, and a payment procedure related to the purchase of the selected recorded images can be performed.

The image capturing system of the present embodiment performs control in which demand information indicating the demand tendencies of a user is updated based on purchase information as needed, and the shooting frequency in automatic shooting is changed based on this demand information in the shooting stage when the shooting sales service is used thereafter. In other words, the shooting sales service not only performs automatic shooting and image sales that are completed for one event, but also learns the demands of the user based on purchase information of the user related to one event, and reflects the demands in shooting control in automatic shooting for other events. As a result, in the shooting stage, control is performed so as to increase the shooting frequency when a subject is in a state (composition) that is highly demanded by the user, and the number of recorded images that are shot in this state can be increased. Furthermore, in the sales stage, the user, or user, can select images to be purchased from among a larger number of recorded images that match their preference, and a business operator who provides the service can expect an increase in the profits.

Therefore, in providing the shooting sales service of the present embodiment, processing of the following sequence is executed in the image capturing system. Note that the following describes, as an example of the present invention, a mode in which in a case where one user has made a request for shooting their child with respect to an event in which the present image capturing system is used, the image capturing apparatus 100 performs automatic shooting of scenes that include this child in response to this request.

<User Registration Sequence>

In the shooting sales service of the present embodiment, a person associated with a user who has made a shooting request is selected as a subject in the shooting stage, as stated earlier. That is to say, it is necessary that the subject for the user who uses the service needs to be set prior to the beginning of the shooting stage. Furthermore, in order to control the shooting frequency in automatic shooting based on past purchase information, it is necessary to recognize who the user is, and obtain past purchase information of this user, or information of demand tendencies that have been learned based thereon, prior to the beginning of the shooting stage.

Therefore, it is assumed that each user has performed user registration to use the shooting sales service. In the image capturing system of the present embodiment, processing related to the user registration is executed in the provider server 140. It is sufficient to configure the user registration so that, for example, it can be performed on the service providing site related to the provider server 140, and each user performs the user registration by accessing the service providing site from the client terminal 160 with use of a browser. Once a user has performed the user registration, information related to this user (user information) is registered and managed in, for example, a database included in the provider server 140. User information managed in the database may include not only identification information that uniquely identifies a user, such as a user ID, but also information of a face image of a person who is a subject related to this user.

<Demand Information Generation Sequence>

Also, in order to reflect the tendencies of demands for the images purchased by users in automatic shooting of the image capturing apparatus 100, purchase information of each user is also shared with the collection server 150. Similarly to the provider server 140, the collection server 150 manages pieces of information of the respective users who use the shooting sales service in a non-illustrated database. It is assumed that information managed for each user in the database of the collection server 150 includes a user ID of this user, and information of a learning result obtained through machine learning based on purchase information of this user (demand information). The demand information is generated and sequentially updated in the collection server 150 based on purchase information of the user. The collection server 150 of the present embodiment analyzes the occupancy rates of a subject region in the recorded images purchased by the user, and learns these occupancy rates as the occupancy rates that are demanded by the user. It is assumed in the present embodiment that a face region of a subject associated with the user is specified as a subject region. Here, the occupancy rate of a face region of a subject in a recorded image is obtained by deriving the area of this face region as, for example, the number of pixels, and dividing this number of pixels by the total number of pixels in the recorded image. It is assumed in the present embodiment that the occupancy rate is learned after rounding the occupancy rate to the nearest ten and classifying the rounded occupancy rate as a value in units of 10%. Therefore, demand information generated by the collection server 150 is the result of learning the types of preferred occupancy rates and the degrees at which recorded images with the respective types of occupancy rates are desired by a user (purchase frequencies), based on purchase information, on a per-user basis. Regarding demand information, when purchase information indicating the recorded images that have been newly purchased by a corresponding user has been obtained, the demand tendencies of the user are updated together with the learning result up until the previous time.

Note that in order for demand information to be information that appropriately reflects a user's preference, it is sufficient that the demand information be used in later-described automatic shooting under the condition that purchase information related to at least a predetermined number of recorded images has been obtained for this user. That is to say, in a case where the number of the recorded images that have been purchased is small (the number of samples is small), even if demand information has been generated based on purchase information thereof, there is a possibility that the demand information does not suitably indicate the user's demand. Therefore, demand information that has been generated in relation to a user may be used under the condition that purchase information has been learned in relation to recorded images that are, in number, equal to or larger than a set number with which the demand tendencies of the user are indicated by the demand information. In this case, it is permissible to adopt a configuration in which demand information is not generated until this condition is satisfied, that is to say, demand information related to a user is not generated until at least a predetermined number of recorded images have been purchased.

<Automatic Shooting Sequence>

Also, in the shooting stage, the image capturing apparatus 100 performs automatic shooting by recognizing a subject to be shot included in a scene (a person associated with a user who has made a shooting request; hereinafter referred to as a target subject), without accepting an operational input related to a shooting instruction from the user. Although the image capturing apparatus 100 is placed so that it can shoot scenes, the target subject is not necessarily captured constantly within the angle of view thereof. For this reason, the automatic shooting sequence includes a search operation for performing control so that the target subject is discovered and captured within the angle of view, and a shooting determination operation for determining whether to perform automatic shooting by evaluating the state of the target subject captured within the angle of view after adjusting the composition.

(Processing Related to Search Operation)

First, an overview of the search operation of the image capturing apparatus 100 will be described with reference to a flowchart of FIG. 4. Processing corresponding to the present flowchart can be executed by the first control unit 323 reading out a corresponding processing program stored in, for example, the nonvolatile memory 316, deploying the processing program to a built-in memory, and executing the processing program. The present processing will be described as being started, for example, when it has been determined that a target subject has not been captured within the angle of view, or when the position of a target subject that has been captured within the angle of view has changed.

In step S401, under control of the first control unit 323, the recognition unit 325 obtains the status of distribution of predetermined objects in an image to be captured under the current image capturing settings. More specifically, first, the image processing unit 307 applies predetermined image processing to a captured image obtained by the image capturing unit 306, and generates an image for subject detection (hereinafter referred to as an image for detection). Then, the recognition unit 325 obtains the status of distribution by executing detection processing for detecting the images of the predetermined objects with respect to this image for detection. In the present embodiment, as the target subject is a person, the recognition unit 325 detects the images of people as the predetermined objects in the detection processing.

The detection of the images of people may be performed by detecting faces and human bodies from the image for detection. For example, in the face detection processing, with use of a pattern that has been provided in advance for specifying a face of a person, a region indicating this pattern in the image for detection is detected as a face region of a person. It is assumed that, at this time, the recognition unit 325 concurrently derives a reliability degree indicating the certainty at which the detected face region is a face. It is assumed that the reliability degree is derived based on, for example, the size of the face region in the image for detection, a degree of coincidence between the face region and a face pattern, and the like.

In step S402, the first control unit 323 derives a shake (vibration) applied to the image capturing apparatus 100 as an absolute angle based on information of the angular velocity and acceleration obtained by the shake detection unit 309. Then, the first control unit 323 derives, as an image blur correction amount, a rotation angle with which image blur correction is performed by driving the tilt rotation unit 203 and the pan rotation unit 204 in an angular direction that cancels out the derived absolute angle.

In step S403, the first control unit 323 determines the placement state of the image capturing apparatus 100. More specifically, the first control unit 323 determines the placement state based on the angular velocity information and the acceleration information obtained by the shake detection unit 309, or on the shooting direction and the moving amount of the image capturing apparatus 100 that have been obtained based on, for example, position information output from a non-illustrated GPS sensor. The placement state indicates what kind of vibration state and motion state the image capturing apparatus 100 is currently in. For example, in a case where the image capturing apparatus 100 is moving faster than a predetermined speed, it is estimated to be mounted on a moving body, such as a vehicle, and thus the first control unit 323 determines that the placement state is "a state of vehicular movement". Also, for example, in a case where the amount of change in the image capturing direction is smaller than a reference value, the first control unit 323 determines that the placement state is "a stationary shooting state" where the image capturing apparatus 100 is experiencing almost no shake. Furthermore, for example, in a case where the amount of change in the image capturing direction is larger than the reference value, it is expected that a person is holding the image capturing apparatus 100, and thus the first control unit 323 determines that the placement state is "a hand-held state". The changes in an image within the captured images that are sequentially obtained can vary depending on what kind of placement state the image capturing apparatus 100 is in; therefore, information of the placement state obtained in the present step is referenced in determining a search target area, which will be described later.

In step S404, the first control unit 323 determines the image capturing direction in which the existence of the target subject is searched for next. The determination of the image capturing direction includes the processes of "area division", "derivation of an importance level on a per-area basis", and "determination of a search target area". Each process will be described below in more detail.

(1) Area Division

Figure 5A:
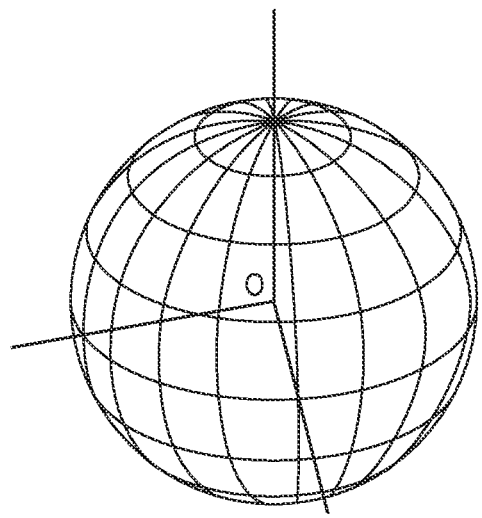
FIGS. 5A, 5B, 5C and 5D are diagrams for describing a search operation according to embodiments and modification examples of the present invention.
Figure 5B:
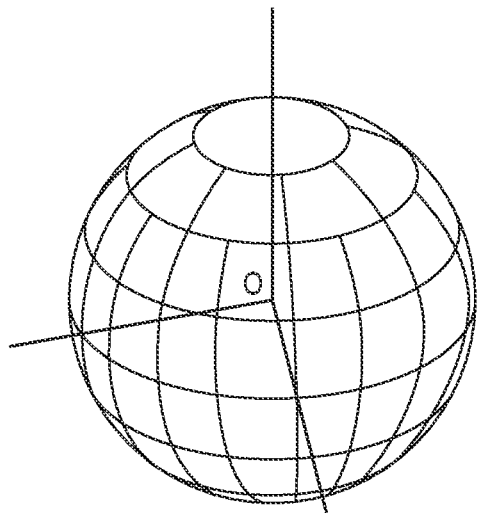

The process of area division is now described using FIG. 5A. In an example of FIG. 5A, the image capturing apparatus 100 is located at an origin O, and the entire circumference centered at the image capturing apparatus 100 has been divided into areas. In the example of FIG. 5A, the division has been performed in units of 22.5 degrees in each of the tilt direction and the pan direction. Meanwhile, in a mode in which the division is performed as in FIG. the circumferential distance in the horizontal direction become shorter and the divided areas become smaller as the angle in the tilt direction departs from 0 degrees. For this reason, as shown in FIG. 5B, with regard to regions in which the tilt angle is 45 degrees or more, the divided areas are set to have a width larger than 22.5 degrees in the horizontal direction (pan direction).

Figure 5C:
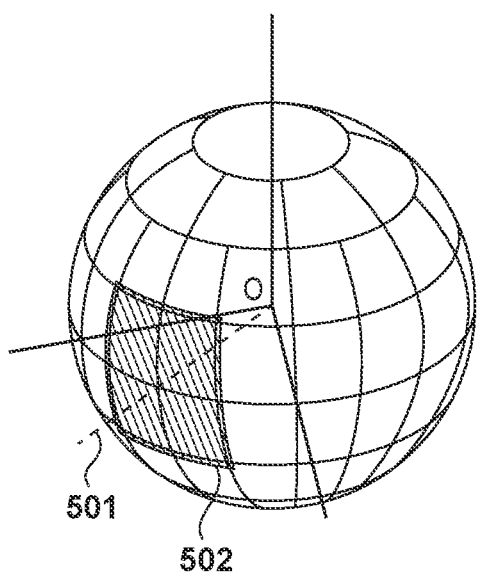
Figure 5D:
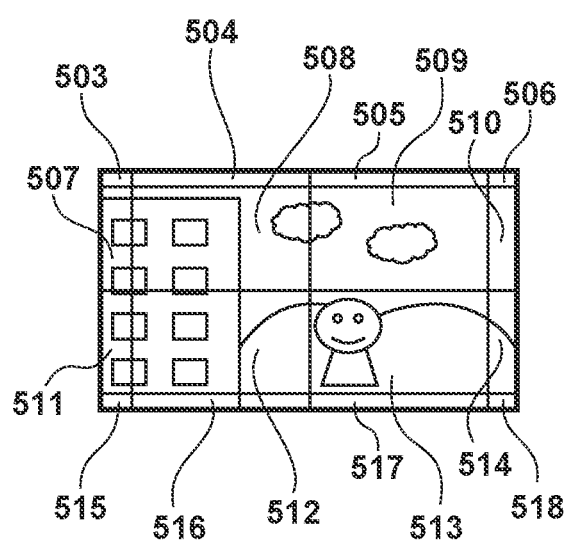

FIGS. 5C and 5D show examples of a region that has been divided into areas within the angle of view pertaining to image capture. In FIG. 5C, an axis 501 is the direction of the image capturing apparatus 100 in an initialized state, and the area division is performed using this direction as a reference position. An area 502 denotes an area that has been captured within the angle of view pertaining to image capture performed in the initialized state, and FIG. 5D exemplarily shows a captured image that is captured in this case. As shown in the figure, regions 503 to 518 in the captured image correspond to different divided areas, respectively.

(2) Derivation of Importance Level on Per-Area Basis

Subsequently, with respect to each of the areas that have been divided in the foregoing manner, the first control unit 323 derives an importance level indicating a priority order in which the search is performed in accordance with the status of a subject (person) that exists in the area. The importance level based on the status of the subject is derived based on, for example, the number of people who exist inside the area, the sizes of the faces of the people, the directions of the faces, the certainties of face detection, the facial expressions of the people, the results of individual recognition of the people, and the like. In deriving the importance level of each area, the importance level may be further adjusted based on the placement state of the image capturing apparatus 100 determined in step S403.

Note that although the present embodiment is described in relation to a mode in which the importance level of each area is derived based on information related to a person because the target subject is a person, the importance level may be derived based on other information. The importance level may be derived in accordance with, for example, the status of the scene; for example, the result of recognition of an object in the scene, the result of scene distinction (a blue sky, a backlight, a nightscape, or the like), the level of a sound that has been made from the direction of the area, the result of sound recognition, information of detection of a motion inside the area, and the like can be used in the derivation.

Furthermore, there is a possibility that the area with the highest importance level remains the same if only the foregoing conditions are used unless the areas undergo a change, and consequently, the search target area does not change; for this reason, the importance level may be adjusted in accordance with past shooting information. Specifically, the first control unit 323 may lower the importance level of an area that has been continuously designated as the search target for a predetermined uninterrupted period, or lower the importance level of an area corresponding to the direction in which shooting has been performed within a predetermined period.

(3) Determination on Search Target Area

The first control unit 323 determines the search target area based on the importance levels that have been derived for the respective areas. It is sufficient that the first control unit 323 determine, for example, an area with the highest importance level obtained in the step (2) as the search target area.

Once the search target area has been determined in this way, the first control unit 323 determines the image capturing direction of the image capturing apparatus 100 for capturing this area within the angle of view, and derives the pan and tilt angles that are necessary to orient the lens barrel 201 in this image capturing direction (hereinafter referred to as a search target angle).

In step S405, the first control unit 323 executes pan and tilt driving associated with the change in the image capturing direction. More specifically, the first control unit 323 derives an amount of pan and tilt driving by adding the image shake correction amount at a control sampling frequency derived in step S402 and a driving angle based on the search target angle derived in step S404. Then, the first control unit 323 causes the rotational driving unit 305 to control driving of the tilt rotation unit 203 and the pan rotation unit 204 using the derived amount of pan and tilt driving.

In step S406, the first control unit 323 determines whether the target subject exists in the scene. This determination is made by the recognition unit 325 executing face recognition processing using a captured image related to the image capturing direction changed in step S405. More specifically, the recognition unit 325 detects face regions with respect to the captured image similarly to step S401, and determines whether the detected face regions represent a face region of the target subject by executing the face recognition processing with respect to each of the detected face regions. With regard to the face recognition of the target subject, a face image of the target subject associated with the user who has made the shooting request is obtained from the provider server 140, and the face recognition is performed using this face image. In a case where it is determined that the captured image includes the face region of the target subject as a result of the face recognition processing, the first control unit 323 determines that the target subject exists in the scene, and ends processing related to the present search operation. Furthermore, in a case where it is determined that the target subject does not exist in the scene, the first control unit 323 causes processing to return to step S401, and repeats the search operation.

(Processing Related to Shooting Determination)

In a case where it is determined that the target subject exists in the scene in processing related to the above-described search operation, the first control unit 323 executes processing related to the shooting determination. More specifically, the first control unit 323 adjusts shooting parameters by determining the composition with which the target subject is to be shot, and determines whether to shoot an image for recording based on a captured image that has been obtained thereafter by the image capturing unit 306 (an image for determination).

In the image capturing apparatus 100 of the present embodiment, the occupancy rate of the face region of the target subject in an image that is recorded in a case where automatic shooting has been performed (hereinafter referred to as the occupancy rate for recording) is determined as the composition with which the target subject is to be shot. In other words, it is assumed that the composition used when the image capturing apparatus 100 of the present embodiment performs automatic shooting is set based on the extent to which the face of the target subject occupies the angle of view. For example, once the occupancy rate for recording has been determined, the first control unit 323 derives a zoom factor to be applied to the zoom unit 301 based on the current size of the face region of the target subject (in the captured image used in the face recognition of step S406), and on this occupancy rate for recording that has been determined. Then, the zoom control unit 302 controls the zoom unit 301 based on this zoom factor; consequently, the image capturing unit 306 obtains an image for determination showing the determined composition (occupancy rate for recording).

Incidentally, the shooting sales service is intended to sell the recorded images that have been autonomously shot by the image capturing apparatus 100 to the user, and in a stage where the user's taste (demand tendencies) cannot be specified, it is necessary to perform shooting with a variety of compositions in order to grasp what kind of compositions are preferred by the user. For this reason, under default settings, that is to say, in a case where demand information of the user who has made the shooting request has not been obtained, the first control unit 323 performs control to achieve a variety of compositions in automatic shooting by randomly determining the occupancy rate for recording. In other words, in a case where automatic shooting is performed under default settings without the obtainment of demand information, for example, one type is adopted, completely at random, from among the occupancy rates of 10% to 100% that have been set in units of 10% (ten types), via lottery processing and the like as the occupancy rate for recording related to the composition. Note, in order to facilitate the understanding of the invention, it is assumed in the present embodiment that the collection server 150 does not configure demand information related to a user until the number of recorded images purchased by this user exceeds a predetermined number. That is to say, when the image capturing apparatus 100 has obtained the demand information, it means that the results of learning the tendencies of demands for compositions based on the purchase history of the user have been accumulated. On the contrary, when the image capturing apparatus 100 has not obtained the demand information, it means that the tendencies of demands for compositions related to the user remain unclear because there is no history of purchase by the user, or the number of purchased images is small.

However, as the recorded images that have been obtained through automatic shooting with the occupancy rate for recording that has been randomly determined can take a composition that does not match the user's preference, they may not be consequently purchased by the user during the sales thereof, and the sales are not likely to make profits in the shooting sales service. For this reason, in the image capturing apparatus 100 of the present embodiment, in a case where the demand tendencies of the user have been specified, the occupancy rate for recording is determined by reflecting such demand tendencies in order to increase the number of recorded images with the composition that matches the user's preference. More specifically, the first control unit 323 performs control so that, in a case where the demand information related to the user who has made the shooting request has been obtained, the probabilities of adoption of the occupancy rates that have been set to be demanded by the user in this demand information become higher than in the default state. In this case, the probability of adoption of each occupancy rate set in the demand information is increased in accordance with the magnitude of demand (the degree of preference) of the user for the occupancy rate.

For example, assume that the result of learning the demand tendencies of a user (the occupancy rates of the face region of the target subject) with regard to four recorded images purchased by the user is as shown in FIG. 6A. In the example of FIG. 6A, the demand information includes a learning result indicating that, with regard to the four recorded images purchased by the user, two images correspond to an occupancy rate of 40%, one image corresponds to an occupancy rate of 20%, and one image corresponds to an occupancy rate of 10%. In this case, the first control unit 323 uses four types of occupancy rates, namely the "occupancy rate of 40%", "occupancy rate of 20%", and "occupancy rate of 10%" for which the demand has been indicated by the demand information, as well as the default "random occupancy rate", as candidates for the occupancy rate for recording, and adopts one type among these candidates as the occupancy rate for recording. That is to say, in a case where the demand information has been obtained, the first control unit 323 includes the "occupancy rate of 40%", "occupancy rate of 20%", and "occupancy rate of 10%" that have been actually demanded by the user as candidates for the occupancy rate for recording, separately from the "random occupancy rate". Consequently, compared to the lottery processing that only uses the "random occupancy rate" under default settings, the probability that these occupancy rates (40%, 20%, and 10%) are adopted is increased.

Specifically, the probability of adoption of each candidate changes in accordance with whether the demand information has been obtained as shown in FIG. 6B. FIG. 6B shows both the proportion (the probability of adoption) of each candidate for the occupancy rate for recording in a case where the demand information has not been obtained, and the proportion of each candidate for the occupancy rate for recording in a case where the demand information has been obtained. The former represents default settings; only the "random occupancy rate" serves as the candidate for the occupancy rate for recording, and each time, the first control unit 323 executes the lottery processing for adopting one type from among the ten types of occupancy rates, namely 10% to 100%, as the composition with which the target subject is to be captured. Then, the first control unit 323 performs control to change the zoom factor so as to achieve the occupancy rate for recording corresponding to the lottery result.

On the other hand, the latter represents a case where the demand information of FIG. 6A has been obtained; the candidates for the occupancy rate for recording include the "occupancy rate of 40%", "occupancy rate of 20%", and "occupancy rate of 10%" in addition to the "random occupancy rate". That is to say, the first control unit 323 first executes the lottery processing for adopting one type from among the "random occupancy rate", "occupancy rate of 40%", "occupancy rate of 20%", and "occupancy rate of 10%" as the composition with which the target subject is to be captured. Then, in a case where the lottery result is one of the "occupancy rate of 40%", "occupancy rate of 20%", and "occupancy rate of 10%", the first control unit 323 performs control to change the zoom factor so as to achieve the occupancy rate for recording corresponding to the lottery result. On the other hand, in a case where the lottery result is the "random occupancy rate", the first control unit 323 further executes the lottery processing for adopting one type from among the ten types of occupancy rates, namely 10% to 100%, and performs control to change the zoom factor so as to achieve the occupancy rate for recording corresponding to the lottery result, similarly to the default state.

In the example of FIG. 6B, in the case where the demand information has been obtained, the probability of adoption of the "random occupancy rate" is 60%, and the probabilities of adoption of the occupancy rates that have been set to be in demand in this demand information account for the remaining 40%. Specifically, in a case where the demand tendencies of the user have been analyzed as shown in FIG. 6A, the "occupancy rate of 40%" accounts for half of the remaining 40%, that is to say, 20% of the total, and furthermore, each of the "occupancy rate of 20%" and "occupancy rate of 10%" accounts for half thereof, that is to say, 10% of the total. As described above, in the image capturing apparatus 100 of the present embodiment, in a case where the demand information has been obtained with respect to the user who has made the shooting request, the probabilities of adoption are set in accordance with the magnitudes of demands so that a specific occupancy rate for recording that is in demand is easily adopted. Then, the lottery processing is executed based on the probabilities of adoption that have been set for the respective candidates, and the occupancy rate for recording related to the image for determination used in the shooting determination is determined.

In this way, the frequency of shooting with a composition that matches the user's preference can be increased while still offering an aspect whereby the target subject is shot with a variety of compositions. In other words, in a case where automatic shooting is performed in response to a shooting request from a user who has a purchase history, the image capturing apparatus 100 of the present embodiment can increase the frequency of adoption of a composition related to the occupancy rate for recording that matches the user's preference estimated from the purchase history.

Note that, in order to present an example, the description of FIG. 6B has been provided under the assumption that the probability of adoption of the "random occupancy rate" is set at 60% in the case where the demand information has been obtained; however, the present invention is not limited to being embodied in this way. The probability of adoption of 60% set for the random occupancy rate is merely an example, and may be changed to another value. Furthermore, it goes without saying that this probability of adoption may be changed in accordance with, for example, the magnitude of the number of samples that have been learned in configuring the demand information (the magnitude of the number of images purchased by the user). The "random occupancy rate" need not necessarily be included as a candidate related to the determination of the composition; for example, in a case where a specific condition is satisfied, only the occupancy rates that have been set to be in demand in the demand information may be used as candidates.

Figure 7:
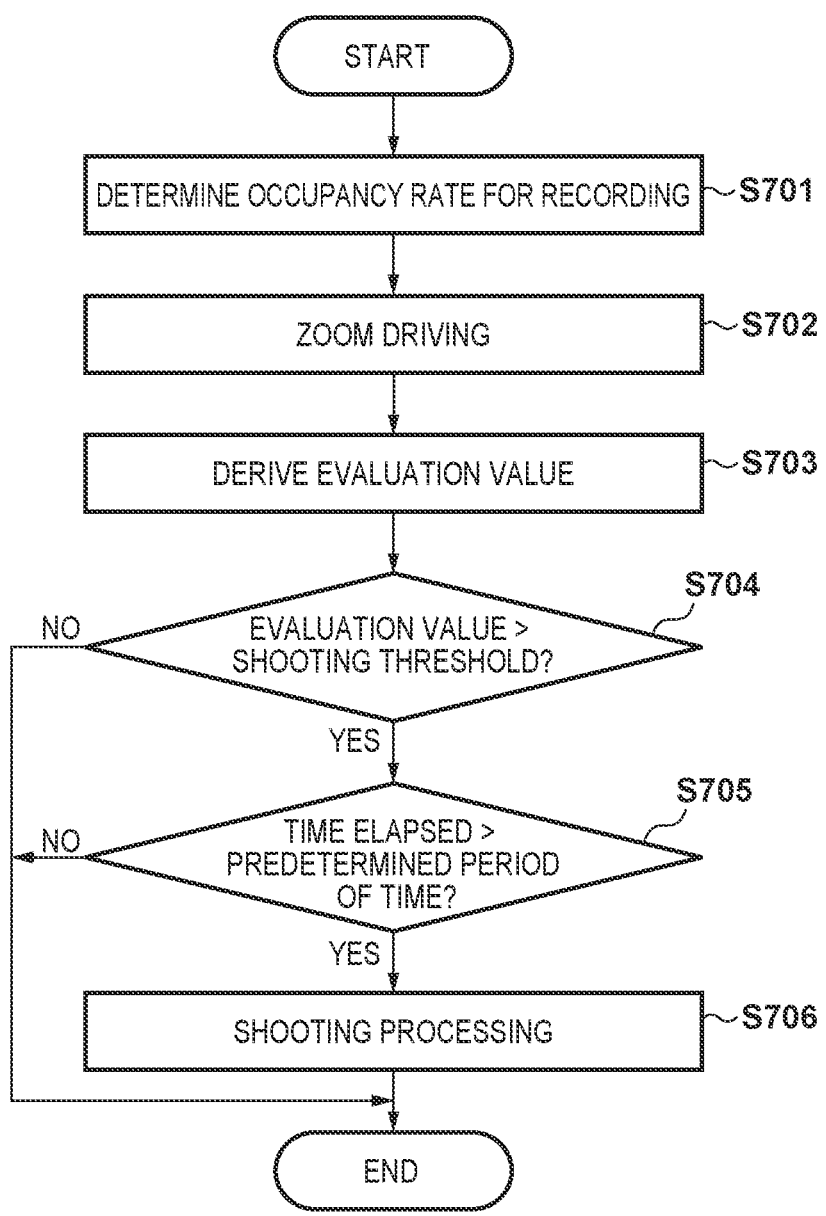
FIG. 7 is a flowchart exemplarily showing processing related to shooting determination in an automatic shooting sequence according to the first embodiment of the present invention.

The following describes the details of the shooting determination operation, including the aforementioned determination of the occupancy rate for recording and change of the zoom factor, with reference to a flowchart of FIG. 7. Processing corresponding to the present flowchart can be executed by the first control unit 323 reading out a corresponding processing program stored in, for example, the nonvolatile memory 316, deploying the processing program to a built-in memory, and executing the processing program. The present processing will be described as being started when, for example, an image for determination has been captured after it has been determined that a target subject exists in the scene through the execution of processing related to the search operation. Furthermore, it is assumed that, prior to the execution of the present processing, information of a face image of a target subject related to the user who has made the shooting request has been obtained. In addition, it is assumed that, in a case where the collection server 150 holds demand information related to this user, this demand information has been obtained. Furthermore, as the execution of the present processing requires that the target subject exist in the scene (image capture range) in the above-described step S406 of processing related to the search operation, it is assumed that a captured image output from the image capturing unit 306 includes at least the face region of the target subject. Note that in order to facilitate the understanding of the invention, the present embodiment will be described under the assumption that shooting performed by the image capturing apparatus 100 is shooting of still images. However, the present invention is not limited to being embodied in this way, and may be used in determining whether to perform a different type of shooting, such as shooting of moving images and continuous shooting.

In step S701, the first control unit 323 determines an occupancy rate for recording based on demand information. As has been described in detail using the examples of FIGS. 6A and 6B, processing of the present step varies depending on whether demand information indicating the tendencies of demands for compositions (the occupancy rates of a face region of a target subject in images) related to a user has been obtained. First, the first control unit 323 specifies candidates for the occupancy rate for recording, and determines the occupancy rate for recording based on one occupancy rate that has been adopted by executing the lottery processing with respect to these candidates.

In step S702, the first control unit 323 executes zoom driving associated with a change in a zoom factor. More specifically, the first control unit 323 determines a zoom factor (zoom parameter) to be applied to the zoom unit 301 based on the occupancy rate of the face region of the target subject in a captured image output from the image capturing unit 306, and on the occupancy rate for recording that has been determined in step S701. Then, the determined zoom factor is transmitted to the zoom control unit 302, and the zoom unit 301 is caused to perform zoom driving. In a captured image that is output from the image capturing unit 306 after the zoom driving of the present step has been performed, the occupancy rate of the face region of the target subject coincides with the occupancy rate for recording that has been determined in step S701; in the subsequent steps, whether to perform shooting is determined based on this captured image. Hereinafter, this captured image will be referred to as an image for determination.

Note, in order to facilitate the understanding of the invention, the present embodiment is described under the assumption that the occupancy rate of the face region of the target subject in the image for determination coincides with the occupancy rate for recording; however, the present invention is not limited to being embodied in this way. The zoom factor that can be set in the zoom unit 301 is restricted in accordance with the driving resolution thereof, and the state of a person who acts as the target subject also changes in sequence; therefore, there is a case where the occupancy rate of the face region of the target subject in the image for determination does not necessarily coincide with the occupancy rate for recording. Therefore, predetermined allowable errors may be provided for the zoom factor, which is determined in connection with the obtainment of the image for determination, and the occupancy rate of the face region of the target subject in the image for determination that has been actually obtained. In other words, the occupancy rate for recording that has been determined in step S701 does not strictly determine the occupancy rate of the face region of the target subject in the image for determination and a recorded image obtained through shooting, but determines a target value used in processing related to the obtainment of these images.

In step S703, the first control unit 323 derives an evaluation value of the image for determination. In deriving the evaluation value, information of the results of face detection and the results of face recognition related to the image for determination, the facial expression of the target subject, and the like may be referenced.

In step S704, the first control unit 323 determines whether the evaluation value of the image for determination exceeds a shooting threshold. The shooting threshold is a value that is determined in advance by the setting unit 326 in relation to the state of the target subject to be shot. In a case where the first control unit 323 has determined that the evaluation value of the image for determination exceeds the shooting threshold, processing proceeds to step S705; in a case where it has determined that the evaluation value does not exceed the shooting threshold, the present processing is completed without performing shooting.

In step S705, the first control unit 323 determines whether a predetermined period has elapsed since the shooting that has been performed most recently. Here, the predetermined period is a period threshold that is set by the setting unit 326 in order to adjust the interval between sessions of shooting performed by the image capturing apparatus 100. While the evaluation value of the image for determination can change moment by moment, captured images with image capture times that are close to one another, such as images that are continuously output from the image capturing unit 306 for example, can have similar evaluation values. Therefore, once the evaluation value of the image for determination has exceeded the shooting threshold, there is a possibility that the evaluation values of captured images that are obtained subsequently thereafter also exceed the shooting threshold in a similar manner. Therefore, if automatic shooting is performed simply under the condition that the evaluation value has exceeded the shooting threshold, there is a possibility that similar images are recorded redundantly. For this reason, it is assumed that the image capturing apparatus 100 of the present embodiment performs control so that, once shooting has been performed, shooting is not performed thereafter until the predetermined period has elapsed, even if the evaluation value exceeds the shooting threshold, so as to prevent the shooting frequency from becoming excessive. In a case where the first control unit 323 has determined that the predetermined period has elapsed since the shooting that has been performed most recently, processing proceeds to step S706; in a case where it has determined that the predetermined period has not elapsed, the present processing is completed without performing shooting.

In step S706, the first control unit 323 executes shooting processing in which the image capturing unit 306 performs the shooting operation and an obtained image is recorded as a recorded image, and the present processing is completed. The recorded image may be recorded inside the image capturing apparatus 100, such as the nonvolatile memory 316 and the recording medium 321, or may be transmitted to and hence recorded into the data server 130 via the communication unit 322.

As described above, the control apparatus of the present embodiment can realize automatic shooting in which images that conform with the user's demands are easily recorded. More specifically, the control apparatus obtains demand information which has been configured based on the occupancy rates of a face region of a target subject in the recorded images that have been purchased by a user, and which indicates the demand tendencies of this user in relation to the occupancy rates of the face region. Then, the control apparatus sets a plurality of types of candidates for the occupancy rate for recording based on the demand information, adopts one of the candidates via the lottery processing and the like, and uses the adopted candidate in shooting. Here, the control apparatus sets the frequency of adoption of each candidate so as to increase the frequencies of adoption of candidates that are set to be highly demanded by the user in the demand information; consequently, images with the occupancy rates of the user's preference are easily recorded. As a result, in a service that sells recorded images that have been recorded through automatic shooting, the user easily attains images in a suitable state that matches their preference. Furthermore, from the viewpoint of the service provider, there is an increased possibility that the user will purchase recorded images, and an increase in the profits is expected.

Note that although the present embodiment has been described under the assumption that a target subject is, for example, a user him/herself who has made the shooting request, or a person associated with the user, such as a family member or an acquaintance of the user, it is to be easily understood that the present invention is not limited to being embodied in this way. The present invention does not require that the target subject be a person; for example, any type of object, such as an animal like a dog or a cat, and another entity, may also be used as a subject. In this case, it is sufficient that the demand tendencies of a user be analyzed based on, for example, the occupancy rates of a region related to a target subject (a subject region) in the recorded images that have been purchased. Therefore, learning of the demand tendencies of the user is not limited to being performed with respect to the occupancy rates of a face region of a person in recorded images; the area from which the occupancy rate is derived may be adaptively changed in accordance with the type of an object selected as a target subject. That is to say, a subject region is not limited to a face region of a person, and may be a specific part or an entirety of a human body, or may be a part or an entirety of a target object.

Furthermore, although the present embodiment has been described under the assumption that subjects are detected using a method that specifies regions that match a preset image pattern, the present invention is not limited to being embodied in this way. The detection of subjects may incorporate another method, such as a method of extracting feature subjects using a histogram of hue, saturation, or the like in a captured image. The method of extracting feature subjects executes processing in which, with regard to the images of subjects that have been captured within the angle of view pertaining to shooting, a distribution derived from this histogram of hue, saturation, or the like is divided into a plurality of sections, and a captured image is classified on a per-section basis. For example, a histogram of a plurality of color components is generated with respect to the captured image, a mountain-shaped distribution range therein is divided, the captured image is classified based on regions that belong to a combination of the same sections, and regions that show the images of the subjects are specified. In this case, the recognition unit 325 can also derive the evaluation values respectively for the specified regions of the subjects, and specify a region with the largest evaluation value thereamong as a main subject region.

Furthermore, although the present embodiment has been described under the assumption that processing related to the shooting determination is executed under the condition that a target subject exists in the scene in processing related to the search operation in the automatic shooting sequence, the present invention is not limited to being embodied in this way. Automatic shooting of the image capturing apparatus 100 need not be performed only with respect to a specific target subject; for example, a composition that conforms with the demand tendencies may be determined with respect to any person who has been detected. In this case, it is sufficient that the first control unit 323 recognize, for example, a person included in the image for determination, specify a user with which this person is associated, obtain demand information related to this user, and make the shooting determination.

Second Embodiment

Although the above embodiment has been described in relation to a mode in which the occupancy rate of a face region of a target subject in an image that is recorded in a case where automatic shooting has been performed is determined as a composition with which the target subject is to be shot, the present invention is not limited to being embodied in this way. The composition is not limited being designated by such an occupancy rate of a region related to a target subject within the angle of view, and may be designated using other items. The present embodiment will be described in relation to a mode in which a composition with which a target subject is to be shot is designated as a position of a face region of a target subject in an image that is recorded in a case where automatic shooting has been performed (hereinafter referred to as a face position for recording). Note that although the image capturing system of the present embodiment may be similar to the system that has been exemplarily described in the first embodiment, the systems differ from each other in an automatic shooting sequence in the image capturing apparatus 100, and in demand information that is learned and managed by the collection server 150.

The collection server 150 of the present embodiment analyzes the positions of a face region of a target subject in the recorded images purchased by a user, and learns these positions as face positions that are demanded by the user. It is assumed in the present embodiment that the analysis on a face position of a target subject in a recorded image includes classification indicating one of the nine regions (A to I) in which the face position is placed as shown in FIG. 8A, the nine regions being defined by dividing the image into thirds both in the horizontal direction and in the vertical direction. The region in which the face position is placed may be specified based on, for example, the position of the center of mass of the face region of the target subject included in the recorded image. Therefore, demand information generated by the collection server 150 of the present embodiment is configured as the result of learning the types of preferred face positions and the degrees at which recorded images with the respective types of face positions are desired by a user (purchase frequencies), based on purchase information, on a per-user basis.

<<Automatic Shooting Sequence>>

The following describes processing in relation to the automatic shooting sequence performed by the image capturing apparatus 100 of the present embodiment. Note, with regard to processing of the automatic shooting sequence of the present embodiment, steps that execute processing similar to processing of the first embodiment are given the same reference numerals thereas, and a description thereof is omitted; the following describes only steps that execute processing unique to the present embodiment.

(Processing Related to Search Operation)

First, an overview of a search operation of the image capturing apparatus 100 will be described with reference to a flowchart of FIG. 9. Processing corresponding to the present flowchart can be realized by the first control unit 323 reading out a corresponding processing program stored in, for example, the nonvolatile memory 316, deploying the processing program to a built-in memory, and executing the processing program. The present processing will be described as being started, for example, when it has been determined that a target subject has not been captured within the angle of view, or when the position of a target subject that has been captured within the angle of view has changed.

When the pan and tilt driving associated with a change in the image capturing direction has been executed in step S405, the first control unit 323 executes zoom driving associated with a change in a zoom factor in step S901. More specifically, the first control unit 323 determines a zoom factor to be applied to the zoom unit 301 in accordance with the sizes of face regions that are distributed in the search target area determined in step S404. In the present embodiment, as a composition is determined and shooting is performed after precisely specifying a face region corresponding to a target subject, it is necessary that the face regions included in the search target area be shot at sizes with which face recognition can be performed. That is to say, if the size of a face region in an image for determination to be used in the shooting determination is too small, whether a person related to this face region is the target subject cannot be determined. Therefore, in a case where the face regions included in the search target area fall below the minimum size to which face recognition processing can be applied, the first control unit 323 changes the zoom factor toward the telephoto end, and performs zoom driving so that the image for determination is obtained in a state where the sizes of these face regions have been increased. On the other hand, if the sizes of the face regions included in the search target area are too large, there is a possibility that these face regions do not fit within the angle of view in the image for determination in a case where the subject or the image capturing apparatus 100 has moved thereafter before the timing of image capture of the image for determination. Therefore, in a case where the face regions included in the search target area exceed a predetermined size, the first control unit 323 changes the zoom factor toward the wide angle end, and performs zoom driving with respect to the image for determination in a state where the sizes of these face regions have been reduced. In the image capturing system of the present embodiment, the demand tendencies of a user are learned after classifying the face positions into the regions shown in FIG. 8A, and thus the size of the face region of the target subject after the zoom driving may be adjusted to a size that fits the size of these regions. In this way, the success rate of the face recognition processing for the image for determination can be increased, and furthermore, appropriate angle-of-view control can be realized also in a case where, for example, shooting is performed while tracking a specific subject. After such zoom driving has been executed, the first control unit 323 causes processing to proceed to step S406.

(Processing Related to Shooting Determination)

Subsequently, in a case where it is determined that the target subject exists in the scene in processing related to the search operation, the first control unit 323 executes processing related to the shooting determination. More specifically, the first control unit 323 adjusts shooting parameters by determining the composition with which the target subject is to be shot, and determines whether to shoot an image for recording based on a captured image that has been obtained thereafter by the image capturing unit 306 (an image for determination).

As stated earlier, in the image capturing apparatus 100 of the present embodiment, the face position of the target subject in an image that is recorded in a case where automatic shooting has been performed (the face position for recording) is determined as the composition with which the target subject is to be shot. In other words, it is assumed that the composition used when the image capturing apparatus 100 of the present embodiment performs automatic shooting is set based on the position at which the face of the target subject is captured within the angle of view. For example, once the face position for recording has been determined, the first control unit 323 derives a shooting parameter associated with a change in the shooting direction based on the position of the face region and the subject distance of the target subject in the current captured image (the captured image used in the face recognition of step S407), and on this face position for recording that has been determined. That is to say, the first control unit 323 derives the amount of pan and tilt driving to be applied to the tilt rotation unit 203 and the pan rotation unit 204 in order for the face region of the target subject to be captured at the face position for recording. Then, the rotational driving unit 305 controls the tilt rotation unit 203 and the pan rotation unit 204 based on this amount of pan and tilt driving; as a result, the image capturing unit 306 obtains an image for determination showing the determined composition (face position for recording).

Similarly to the first embodiment, in a stage where the demand tendencies of the user have not been specified, the image capturing apparatus 100 performs shooting with a variety of compositions, using default settings related to a face position, in order to grasp what kind of compositions are preferred by the user. Therefore, under default settings, the first control unit 323 performs control so that the face position for recording is randomly determined to achieve a variety of compositions in automatic shooting. In the example of the present embodiment, demand information is configured by learning the demand tendencies of the user based on one of the nine types of regions into which the face position in a recorded image is classified as shown in FIG. 8A; therefore, in a default state, one of these regions is adopted as the face position for recording.

Meanwhile, a recorded image that is obtained through automatic shooting in accordance with a face position for recording that has been randomly determined can take a composition that does not match the user's preference; therefore, in a case where the demand tendencies of the user have been specified, the image capturing apparatus 100 of the present embodiment adopts a face position for recording in accordance with the demand tendencies. That is to say, in a case where the image capturing apparatus 100 has obtained demand information indicating the demand tendencies of the user, control is performed so that the probabilities of adoption of the face positions that have been set to be demanded by the user in this demand information become higher than in the default state. In this case, the probability of adoption of each face position set in the demand information is increased in accordance with the magnitude of demand (the degree of preference) of the user for the face position.

For example, assume that the result of learning the demand tendencies of a user (the face positions of the target subject) with regard to four recorded images purchased by the user is as shown in FIG. 8B. In the example of FIG. 8B, the demand information includes a learning result indicating that, with regard to the four recorded images purchased by the user, two images correspond to the face position E, one image corresponds to the face position B, and one image corresponds to the face position F. In this case, the first control unit 323 uses four types of face positions, namely the "face position E", "face position B", and "face position F" for which the demand has been indicated by the demand information, as well as the default "random face position", as candidates for the face position for recording, and adopts one type among these candidates as the face position for recording. That is to say, in a case where the demand information has been obtained, the first control unit 323 includes the "face position E", "face position B", and "face position F" that have been actually demanded by the user as candidates for the face position for recording, separately from the "random face position". Consequently, compared to the lottery processing that only uses the "random face position" under default settings, the probability that these face positions (E, B, and F) are adopted is increased.

Specifically, the probability of adoption of each candidate changes in accordance with whether the demand information has been obtained as shown in FIG. 8C. FIG. 8C shows both the proportion (the probability of adoption) of each candidate for the face position for recording in a case where the demand information has not been obtained, and the proportion of each candidate for the face position for recording in a case where the demand information has been obtained. The former represents default settings; only the "random face position" serves as the candidate for the face position for recording, and each time, the first control unit 323 executes the lottery processing for adopting one type from among the nine types of face positions A to I as the composition with which the target subject is to be captured. Then, the first control unit 323 performs control to change the pan and tilt angles so as to achieve the face position for recording corresponding to the lottery result.

On the other hand, the latter represents a case where the demand information of FIG. 8B has been obtained; the candidates for the face position for recording include the "face position E", "face position B", and "face position F" in addition to the "random face position". That is to say, the first control unit 323 first executes the lottery processing for adopting one type from among the "random face position", "face position E", "face position B", and "face position F" as the composition with which the target subject is to be captured. Then, in a case where the lottery result is one of the "face position E", "face position B", and "face position F", the first control unit 323 derives the amount of pan and tilt driving that achieves the face position for recording corresponding to the lottery result, and performs control to change the shooting direction. On the other hand, in a case where the lottery result is the "random face position", the first control unit 323 further executes the lottery processing for adopting one type from among the nine types of face positions A to I, and performs control to change the pan and tilt angles so as to achieve the face position for recording corresponding to the lottery result, similarly to the default state.

In the example of FIG. 8C, in the case where the demand information has been obtained, the probability of adoption of the "random face position" is 60%, and the probabilities of adoption of the face positions that have been set to be in demand in this demand information account for the remaining 40%. Specifically, in a case where the demand tendencies of the user have been analyzed as shown in FIG. 8B, the "face position E" accounts for half of the remaining 40%, that is to say, 20% of the total, and furthermore, each of the "face position B" and "face position F" accounts for half thereof, that is to say, 10% of the total. As described above, in the image capturing apparatus 100 of the present embodiment, in a case where the demand information has been obtained with respect to the user who has made the shooting request, the probabilities of adoption are set in accordance with the magnitudes of demands so that a specific face position for recording that is in demand is easily adopted. Then, the lottery processing is executed based on the probabilities of adoption that have been set for the respective candidates, and the face position for recording related to the image for determination used in the shooting determination is determined.

In this way, the frequency of shooting with a composition that matches the user's preference can be increased while still offering an aspect whereby the target subject is shot with a variety of compositions. In other words, in a case where automatic shooting is performed in response to a shooting request from a user who has a purchase history, the image capturing apparatus 100 of the present embodiment can increase the frequency of adoption of a composition related to the face position for recording that matches the user's preference estimated from the purchase history.

Note that, in order to present an example, the description of FIG. 8C has been provided under the assumption that the probability of adoption of the "random face position" is set at 60% in the case where the demand information has been obtained; however, the present invention is not limited to being embodied in this way. The probability of adoption of 60% set for the random face position is merely an example, and may be changed to another value. Furthermore, it goes without saying that this probability of adoption may be changed in accordance with, for example, the magnitude of the number of samples that have been learned in configuring the demand information (the magnitude of the number of images purchased by the user). The "random face position" need not necessarily be included as a candidate related to the determination of the composition; for example, in a case where a specific condition is satisfied, only the face positions that have been set to be in demand in the demand information may be used as candidates.

The following describes the details of the shooting determination operation, including the aforementioned determination of the occupancy rate for recording and change of the zoom factor, with reference to a flowchart of FIG. 10. Processing corresponding to the present flowchart can be realized by the first control unit 323 reading out a corresponding processing program stored in, for example, the nonvolatile memory 316, deploying the processing program to a built-in memory, and executing the processing program. The present processing will be described as being started, for example, when it has been determined that a target subject exists in the scene through the execution of processing related to the search operation. Similarly to the first embodiment, it is assumed that, prior to the execution of the present processing, information of a face image of a target subject related to the user who has made the shooting request has been obtained. In addition, it is assumed that, in a case where the collection server 150 holds demand information related to this user, this demand information has been obtained.

In step S1001, the first control unit 323 determines a face position for recording based on demand information. As has been described in detail using the examples of FIGS. 8A, 8B and 8C, processing of the present step varies depending on whether demand information indicating the tendencies of demands for compositions related to a user has been obtained. The first control unit 323 first specifies candidates for the face position for recording, and determines the face position for recording based on one face position that has been adopted by executing the lottery processing with respect to these candidates.

In step S1002, the first control unit 323 executes pan and tilt driving so as to capture a face region of a target subject at the face position for recording that has been determined in step S1001. More specifically, the first control unit 323 determines the amount of pan and tilt driving to be applied to the pan rotation unit 204 and the tilt rotation unit 203 based on a face position of the target subject in a captured image output from the image capturing unit 306, and on the face position for recording that has been determined in step S1001. Then, the determined amount of pan and tilt driving is transmitted to the rotational driving unit 305, and the pan rotation unit 204 and the tilt rotation unit 203 are caused to perform the pan and tilt driving. In a captured image that is output from the image capturing unit 306 after the pan and tilt driving of the present step has been performed (an image for determination), the face position of the target subject coincides with the face position for recording that has been determined in step S1001. In the subsequent step S703 onward, whether to perform shooting is determined based on this image for determination.

As described above, the control apparatus of the present embodiment can realize automatic shooting in which images that conform with the user's demands are easily recorded. More specifically, the control apparatus obtains demand information which has been configured based on a face position of a target subject in the recorded images that have been purchased by a user, and which indicates the demand tendencies of this user in relation to the face position. Then, the control apparatus sets a plurality of types of candidates for the face position for recording based on the demand information, adopts one of the candidates via the lottery processing and the like, and uses the adopted candidate in shooting. Here, the control apparatus sets the frequency of adoption of each candidate so as to increase the frequencies of adoption of candidates that are set to be highly demanded by the user in the demand information; consequently, images with the face position of the user's preference are easily recorded. As a result, in a service that sells recorded images that have been recorded through automatic shooting, the user easily attains images in a suitable state that matches their preference. Furthermore, from the viewpoint of the service provider, there is an increased possibility that the user will purchase recorded images, and an increase in the profits is expected.

First Modification Example

The above first and second embodiments have been described in relation to a mode in which the tendencies of demands for the occupancy rates of a face region of a target subject in images or the face positions thereof are learned as demand information, and control on driving related to a composition is performed by adopting an occupancy rate for recording or a face position for recording from among candidates based on this demand information. However, it is sufficient that the present invention perform control so that a composition that is in high demand be easily adopted in automatic shooting in accordance with the tendencies of demands for compositions related to a user, and the present invention is not limited to the above-described embodiments. That is to say, learning of a composition of the user's preference and determination of a composition related to automatic shooting need not be performed based on the occupancy rates of a face region or the face positions in images, and may be performed based on a combination of these, or on another parameter that specifies a composition.

In addition, the user's demand tendency may include, in addition to a composition, a parameter related to image quality, such as the exposure, ISO film speed, white balance, and depth of field, which is based on the brightness of a subject and the surrounding thereof and on the result of analysis on blur. In this case, candidates for a parameter that is adopted in relation to automatic shooting may include, in addition to parameters related to zooming, panning, and tilting, parameters related to image quality for which the probabilities of adoption have been adjusted in accordance with the demand tendencies.

Second Modification Example

Although the above embodiments and modification example have been described in relation to a mode in which the probability of adoption of each parameter is set in accordance with the magnitudes of demands (the degrees of demands) for compositions of a target subject set in demand information, the present invention is not limited to being embodied in this way. That is to say, although the above embodiments and modification example have been described in relation to a mode that performs control so that the frequencies of adoption of compositions increase in proportion to the values of the degrees of demands for the respective compositions of a target subject, the present invention is not limited to being embodied in this way. It is sufficient that the present invention perform control so that the frequency of adoption is higher for a composition for which a high degree of demand is set in demand information than for a composition for which a lower degree of demand is set, and the extents of the frequencies of adoption need not be set in proportion to the values of the degrees of demand. Furthermore, in this case, the same frequency of adoption may be set with respect to compositions with two different degrees of demand that fall in a predetermined range.

Third Modification Example

The above embodiments and modification examples have been described under the assumption that an evaluation value is derived using the same derivation method in any mode; however, for example, in the case of a composition that is set to be in demand in demand information, the evaluation value may be derived by adding thereto a predetermined value. In this way, the shooting frequency can be further increased in a case where an image for determination takes a composition that is demanded by a user.

Fourth Modification Example

Although the above embodiments and modification examples have been described under the assumption that demand information of each user is configured as a result of the collection server 150 performing machine learning based on purchase information of this user, the present invention is not limited to being embodied in this way. That is to say, the demand information need not be configured as a learning result of machine learning, and may be, for example, statistical data which is based on purchase information and which is configured in the form of a lookup table or the like.

Fifth Modification Example

Furthermore, although the above embodiments and modification examples have been described under the assumption that demand information of an individual is configured as demand tendencies of a user based on pieces of purchase information of respective users, the present invention is not limited to being embodied in this way. Demand information may be, for example, configured based on pieces of purchase information of one or more users who are categorized as an arbitrary set, such as a class, a grade, a school, a school district, or the like to which pupils who act as subjects belong. For example, pieces of demand information are configured as the demand tendencies of the entire guardians of pupils who go to an arbitrary school as a result of performing automatic shooting with respect to subjects, namely a plurality of pupils, at an event held at the school, and by performing learning later based on the recorded images purchased by the guardians. In this case, at an event that is held at this school thereafter, the pieces of demand information associated with the entire guardians are transmitted to the image capturing apparatus 100 and referenced in automatic shooting during the event; as a result, a large number of recorded images with compositions that are averagely desired by a plurality of users (guardians) can be recorded. Note that in this case, as pieces of demand information to be referenced in the shooting determination can be specified on a per-event basis, each user need not be necessarily identified in the shooting stage.

Sixth Modification Example

Furthermore, although the above embodiments and modification examples have been described under the assumption that the image capturing apparatus 100 obtains demand information, and control on driving related to a composition is performed based on the demand information in the shooting determination, the present invention is not limited to being embodied in this way. The control on the operations related to automatic shooting of the image capturing apparatus 100 may be performed in, for example, an external control apparatus (e.g., the communication terminal 110) that is connected to the image capturing apparatus 100 in a communication-enabled manner. In this mode, the control apparatus adopts a composition based on the demand information, and determines whether shooting is to be performed based on an image for determination that has been obtained using the adopted configuration. Then, in a case where the control apparatus has determined that shooting is to be performed, the operations of the image capturing apparatus 100 are controlled based on the determination result.

Seventh Modification Example

Furthermore, although the above embodiments and modification examples have been described under the assumption that recorded images are provided to a user in the form of sales, the present invention is not limited to being embodied in this way. Recorded images may be provided to a user in any form that does not involve a monetary payment. Furthermore, the demand tendencies of a user may be analyzed by collecting arbitrary information based on a user's operation performed for each image, such as an operation performed by the user to select a preferred image by inputting information related to an evaluation indicating the users' preference or by registering a favorite, and the number of views, and may be reflected in demand information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100418, filed Jun. 22, 2022 which is hereby incorporated by reference herein in its entirety.

What is claimed is:

1. A control apparatus that controls an operation of an image capturing apparatus that obtains, through automatic shooting with a variable composition, an image to be sold to a plurality of users, the control apparatus comprising
at least one processor and/or circuit configured to function as the following units:
a first obtainment unit configured to, based on purchase information related to a purchase of images by each of the plurality of users, obtain demand information indicating demand tendencies of a user in relation to compositions of subjects related to each of the plurality of users;
a setting unit configured to, based on the demand information obtained by the first obtainment unit, set frequencies of adoption to automatic shooting of the subjects related to each of the plurality of users respectively for a plurality of types of compositions that have been set in advance; and
a determination unit configured to determine a composition to be used in shooting of the subjects related to each of the plurality of users by the image capturing apparatus based on the frequencies of adoption that have been set by the setting unit respectively for the plurality of types of compositions.

2. The control apparatus according to claim 1, wherein the setting unit sets a higher frequency of adoption for a type of composition that is in higher demand in the demand information.

3. The control apparatus according to claim 1, wherein the setting unit sets a higher frequency of adoption for a type of composition for which a first degree of demand is set as a degree of demand in the demand information than for a type of composition for which a second degree of demand is set, the second degree of demand being in lower demand than the first degree of demand.

4. The control apparatus according to claim 1, wherein the plurality of types of compositions differ from one another in an occupancy rate of a subject region in a shot image, and
the demand information indicates a magnitude of a demand of each of the plurality of users for each of occupancy rates of the subject region in images purchased by each of the plurality of users.

5. The control apparatus according to claim 1, wherein the plurality of types of compositions differ from one another in a position of a subject region in a shot image, and
the demand information indicates a magnitude of a demand of the each of the plurality of users for each of positions of the subject region in images purchased by each of the plurality of users.

6. The control apparatus according to claim 4, wherein the subject region in the shot image is a face region of a person.

7. The control apparatus according to claim 1, wherein the demand information is information that has been configured based on compositions of the subject related to images purchased by each of the plurality of users.

8. The control apparatus according to claim 7, wherein the demand information is a result of learning, through machine learning, tendencies of demands for compositions of the subject based on images purchased by each of the plurality of users.

9. The control apparatus according to claim 1, further comprising:
an identification unit configured to identify a user; and
a detection unit configured to detect a subject associated with the user identified by the identification unit as a target subject,
wherein
the first obtainment unit obtains the demand information associated with the user identified by the identification unit, and
the determination unit determines the composition to be used in the shooting with respect to the target subject detected by the detection unit.

10. The control apparatus according to claim 1, wherein the demand information further includes information that has been configured based on compositions of the subject in a plurality of images that have been determined to be in high demand based on operations performed by the plurality of users among a plurality of images that have been shot at a predetermined event.

11. The control apparatus according to claim 1, further comprising
a changing unit configured to change a shooting parameter of the image capturing apparatus based on the composition to be used in the shooting determined by the determination unit.

12. The control apparatus according to claim 1, further comprising:
a second obtainment unit configured to obtain a captured image that has been captured by the image capturing apparatus, the captured image being related to the composition to be used in the shooting; and
a control unit configured to control whether to cause the image capturing apparatus to perform shooting based on the captured image obtained by the second obtainment unit.

13. An image capturing apparatus, comprising:
an image capturing unit;
the control apparatus according to claim 1; and
a unit configured to cause the image capturing unit to shoot an image for recording based on information of the composition to be used in the shooting determined by the control apparatus.

14. A non-transitory computer-readable recording medium having recorded therein a program for causing a computer to function as each unit of the control apparatus according to claim 1.

15. The control apparatus according to claim 1, wherein the first obtaining unit obtains and manages the demand information for each of the plurality of users.

16. A control method for a control apparatus that controls an operation of an image capturing apparatus that obtains, through automatic shooting with a variable composition, an image to be sold to a plurality of users, the control method comprising:
based on purchase information related to a purchase of images by each of the plurality of users, obtaining demand information indicating demand tendencies of in relation to compositions of subjects related to each of the plurality of users;
based on the obtained demand information, setting frequencies of adoption to shooting of the subjects related to each of the plurality of users respectively for a plurality of types of compositions that have been set in advance; and
determining a composition to be used in shooting of the subjects related to each of the plurality of users by the image capturing apparatus based on the frequencies of adoption that have been set respectively for the plurality of types of compositions.

17. An image capturing system that sells, to a plurality of users, images that have been shot by an image capturing apparatus through automatic shooting while changing a composition, the image capturing system including the image capturing apparatus, a control apparatus that controls an operation of the image capturing apparatus, and a collection server that collects demand tendencies based on images purchased by each of the plurality of users, the control apparatus including at least one processor and/or circuit configured to function as the following units:

an obtainment unit configured to, based on purchase information related to a purchase of images by each of the plurality of users, obtain demand information indicating demand tendencies of each of the plurality of users in relation to compositions of subjects related to each of the plurality of users;

a setting unit configured to, based on the demand information obtained by the obtainment unit, set frequencies of adoption to shooting of the subjects related to each of the plurality of users respectively for a plurality of types of compositions that have been set in advance; and a determination unit configured to determine a composition to be used in shooting of the subjects related to each of the plurality of users by the image capturing apparatus based on the frequencies of adoption that have been set by the setting unit respectively for the plurality of types of compositions.

* * * * *